(12) United States Patent
Nesheim et al.

(10) Patent No.: US 10,544,340 B2
(45) Date of Patent: Jan. 28, 2020

(54) BRINE GENERATION SYSTEM

(71) Applicant: Henderson Products, Inc., Manchester, IA (US)

(72) Inventors: Gary Nesheim, Windsor, WI (US); Clay Hildreth, Noblesville, IN (US); Grant Nesheim, Windsor, WI (US); Peter Nelles, Windsor, WI (US)

(73) Assignee: HENDERSON PRODUCTS, INC., Manchester, IA (US)

( * ) Notice: Subject to any disclaimer, the term of this patent is extended or adjusted under 35 U.S.C. 154(b) by 0 days.

(21) Appl. No.: 14/286,706

(22) Filed: May 23, 2014

(65) Prior Publication Data

US 2014/0251177 A1 Sep. 11, 2014

Related U.S. Application Data

(63) Continuation-in-part of application No. 13/656,412, filed on Oct. 19, 2012.

(51) Int. Cl.
*C09K 3/18* (2006.01)
*B01F 15/02* (2006.01)
(Continued)

(52) U.S. Cl.
CPC .............. *C09K 3/18* (2013.01); *B01F 1/0022* (2013.01); *B01F 1/0033* (2013.01); *B01F 5/10* (2013.01);
(Continued)

(58) Field of Classification Search
CPC .. B01F 1/0022; B01F 1/0038; B01F 15/0202; B01F 1/0033; C09K 3/18; C09K 3/185; C01D 3/14; C01D 3/08; Y10T 137/4891
(Continued)

(56) References Cited

U.S. PATENT DOCUMENTS

| 409,234 A | 8/1889 | Quinn |
| 1,928,859 A | 10/1933 | Kutscha |
(Continued)

FOREIGN PATENT DOCUMENTS

| EP | 0470940 | 5/1995 |
| WO | WO 0051944 | 9/2000 |
| WO | WO 2000051944 | 9/2000 |

OTHER PUBLICATIONS

Cargill Deicing Technology, "Keep Roads Safer by Staying Ahead of the Storm," AccuBrine™ Brochure, May 10, 2011.
(Continued)

*Primary Examiner* — Kevin L Lee
(74) *Attorney, Agent, or Firm* — Leydig, Voit & Mayer, Ltd.

(57) ABSTRACT

A brine generation system includes a tank unit having a tank body and a divider which separates the tank into an upper portion for holding salt crystals and a lower portion for holding brine. The divider is adapted to resist the movement of salt crystals greater than a predetermined size and to permit the brine solution to pass from the upper portion through the divider to the lower portion by the effect of gravity. The divider includes a sump channel having an opening in communication with the upper portion of the tank unit. The sump channel is adapted to collect non-soluble particles greater than a predetermined size and permit the brine solution in the sump channel to pass therethrough to the lower portion of the tank unit. The sump channel is in communication with a sediment discharge port defined in the tank body.

17 Claims, 11 Drawing Sheets

Related U.S. Application Data

(60) Provisional application No. 61/549,504, filed on Oct. 20, 2011.

(51) Int. Cl.
  *B01F 1/00* (2006.01)
  *B01F 5/10* (2006.01)

(52) U.S. Cl.
  CPC ......... *C09K 3/185* (2013.01); *Y10T 137/4891* (2015.04)

(58) Field of Classification Search
  USPC ........................................................ 137/268
  See application file for complete search history.

(56) References Cited

U.S. PATENT DOCUMENTS

| | | | |
|---|---|---|---|
| 2,122,900 A | 7/1938 | Uhrmacher |
| 2,270,372 A | 5/1940 | Hunter |
| 2,281,140 A | 5/1941 | Courthope et al. |
| 2,280,466 A | 4/1942 | Black |
| 2,395,258 A | 8/1942 | Drake |
| 2,533,772 A | 12/1950 | DeFrees |
| 2,551,494 A | 5/1951 | Kaufmann |
| 2,734,804 A | 2/1956 | Courthope et al. |
| 3,036,896 A | 5/1962 | Mackinnon |
| 3,073,607 A | 1/1963 | Christy |
| 3,168,379 A | 2/1965 | Miller |
| 3,190,726 A | 6/1965 | Rudelick |
| 3,227,524 A | 1/1966 | White |
| 3,236,527 A | 2/1966 | Snyder |
| 3,307,914 A | 3/1967 | Heiss et al. |
| 3,343,919 A | 9/1967 | Miller |
| 3,372,995 A | 3/1968 | Ryan |
| 3,385,674 A | 5/1968 | Kolasinski |
| 3,401,890 A | 9/1968 | Middlesworth |
| 3,420,451 A | 1/1969 | Kahibacher |
| 3,574,559 A | 4/1971 | Kyzer et al. |
| 3,595,438 A | 7/1971 | Daley et al. |
| 3,684,457 A | 8/1972 | Pinto et al. |
| 3,800,026 A | 3/1974 | Morgan |
| 3,936,274 A | 2/1976 | Leverenz et al. |
| 3,946,753 A | 3/1976 | Tischler |
| 3,987,808 A | 10/1976 | Carbonell et al. |
| 4,026,673 A | 5/1977 | Russo |
| 4,026,801 A | 5/1977 | Ward |
| 4,031,912 A | 6/1977 | Lu et al. |
| 4,115,270 A | 9/1978 | Phillips |
| 4,116,640 A | 9/1978 | Leverenz |
| 4,121,300 A | 10/1978 | Cosma et al. |
| 4,161,280 A | 7/1979 | Kasinskas |
| 4,166,581 A | 9/1979 | Hetrick |
| 4,212,545 A | 7/1980 | Lovasz et al. |
| 4,230,280 A | 10/1980 | Leigh et al. |
| 4,247,298 A | 1/1981 | Rippie et al. |
| 4,261,520 A | 4/1981 | Hetrick |
| 4,315,602 A | 2/1982 | Kubacak et al. |
| 4,379,125 A | 4/1983 | Benninger et al. |
| 4,403,866 A | 9/1983 | Falcoff et al. |
| 4,433,917 A | 2/1984 | Mendel |
| 4,442,979 A | 4/1984 | Küpper |
| 4,448,682 A | 5/1984 | Moritz |
| 4,474,476 A | 10/1984 | Thomsen |
| 4,483,357 A | 11/1984 | Rao et al. |
| 4,533,254 A | 8/1985 | Cook |
| 4,784,495 A | 11/1988 | Jonsson et al. |
| 4,858,449 A | 8/1989 | Lehn |
| 4,863,277 A | 9/1989 | Neal et al. |
| 4,877,522 A | 10/1989 | Toei et al. |
| 4,976,377 A | 12/1990 | Higuchi et al. |
| 5,069,392 A | 12/1991 | Wise et al. |
| 5,096,125 A | 3/1992 | Wise et al. |
| 5,133,848 A | 7/1992 | Meyers |
| 5,137,694 A | 8/1992 | Copeland et al. |
| 5,169,406 A * | 12/1992 | Tewari ........................ 23/293 R |
| 5,186,396 A | 2/1993 | Wise et al. |
| 5,267,696 A | 12/1993 | Balmer |
| 5,310,113 A | 5/1994 | Cowgur |
| 5,318,226 A | 6/1994 | Kime et al. |
| 5,344,231 A | 9/1994 | Jonsson et al. |
| 5,460,446 A | 10/1995 | Chevallet et al. |
| 5,476,320 A | 12/1995 | Taguchi et al. |
| 5,501,403 A | 3/1996 | van Vooren |
| 5,505,223 A | 4/1996 | Rings et al. |
| 5,515,623 A | 5/1996 | Weeks |
| 5,522,660 A | 6/1996 | O'Dougherty et al. |
| 5,590,960 A | 1/1997 | Clinton et al. |
| 5,647,391 A | 7/1997 | Chan et al. |
| 5,653,389 A | 8/1997 | Henderson et al. |
| 5,653,567 A | 8/1997 | Taylor |
| 5,690,820 A | 11/1997 | Becnel, Jr. et al. |
| 5,772,389 A | 6/1998 | Feller |
| 5,800,056 A | 9/1998 | Suzuki et al. |
| 5,800,506 A | 9/1998 | Perouse |
| 5,819,776 A | 10/1998 | Kephart |
| 5,874,049 A | 2/1999 | Ferri, Jr. et al. |
| 5,881,639 A | 3/1999 | Nesheim et al. |
| 5,904,296 A | 5/1999 | Doherty et al. |
| 5,911,363 A | 6/1999 | Oligschlaeger |
| 5,931,393 A | 8/1999 | Alsip et al. |
| 5,964,410 A | 10/1999 | Brown et al. |
| 5,980,836 A | 11/1999 | Mofett et al. |
| 5,988,535 A | 11/1999 | Kime |
| 5,992,437 A | 11/1999 | Takasaki et al. |
| 6,048,391 A | 4/2000 | De Valk et al. |
| 6,049,391 A | 4/2000 | Farrell |
| 6,062,723 A | 5/2000 | de Valk et al. |
| 6,068,200 A | 5/2000 | Kime |
| 6,089,478 A | 7/2000 | Truan et al. |
| 6,120,175 A | 9/2000 | Tewell |
| 6,123,276 A | 9/2000 | Ungerer et al. |
| 6,173,904 B1 | 1/2001 | Doherty et al. |
| 6,179,230 B1 | 1/2001 | Geroux et al. |
| 6,220,532 B1 | 4/2001 | Manon et al. |
| 6,231,763 B1 | 5/2001 | Chau |
| 6,270,020 B1 | 8/2001 | Thompson et al. |
| 6,308,900 B2 | 10/2001 | Geroux et al. |
| 6,331,255 B1 | 12/2001 | Peddicord |
| 6,354,786 B1 | 3/2002 | Feller |
| 6,382,523 B1 | 5/2002 | Hedegard |
| 6,394,735 B2 | 5/2002 | Hollinrake et al. |
| 6,439,252 B1 | 8/2002 | Kephart |
| 6,446,879 B1 | 9/2002 | Kime |
| 6,451,270 B1 | 9/2002 | Killian et al. |
| 6,468,481 B1 * | 10/2002 | Anderson ..................... 422/261 |
| 6,517,281 B1 | 2/2003 | Rissi |
| 6,585,472 B2 | 7/2003 | Hollinrake et al. |
| 6,736,153 B1 | 5/2004 | Kime |
| 6,761,525 B2 | 7/2004 | Hollinrake et al. |
| 6,786,435 B2 | 9/2004 | Mishra |
| 6,845,298 B2 | 1/2005 | Nelson et al. |
| 6,881,022 B2 | 4/2005 | Feller |
| 6,938,829 B2 | 9/2005 | Doherty et al. |
| 6,945,482 B2 | 9/2005 | Hollinrake et al. |
| 6,962,657 B2 | 11/2005 | Jordan et al. |
| 6,966,688 B2 | 11/2005 | Lins |
| 6,969,190 B1 | 11/2005 | McClain |
| 7,014,715 B2 | 3/2006 | Kim |
| 7,087,162 B2 | 8/2006 | Peddicord |
| 7,108,196 B2 | 9/2006 | Kine |
| 7,168,844 B2 | 1/2007 | Hoerle et al. |
| 7,186,390 B1 | 3/2007 | Hellbusch et al. |
| 7,261,819 B2 | 8/2007 | Jordan et al. |
| 7,363,114 B2 | 4/2008 | Anderson et al. |
| 7,438,827 B2 | 10/2008 | Hoerle et al. |
| 7,461,969 B2 | 12/2008 | Hoerle et al. |
| 7,461,971 B2 | 12/2008 | Hoerle et al. |
| 7,582,205 B1 | 9/2009 | Fiscella, Jr. |
| 7,628,847 B2 | 12/2009 | Pope et al. |
| 7,758,769 B2 | 7/2010 | Sheen et al. |
| 7,803,335 B1 | 9/2010 | Cope |
| 7,810,987 B2 | 10/2010 | Hildreth |
| 7,905,653 B2 | 3/2011 | Wilmer et al. |

(56) References Cited

U.S. PATENT DOCUMENTS

| | | |
|---|---|---|
| 8,128,897 B2 | 3/2012 | Gimelfarb et al. |
| 8,251,569 B2 | 8/2012 | Hildreth |
| 8,382,364 B2 | 2/2013 | Hildreth |
| 8,852,662 B2 | 10/2014 | Nesheim et al. |
| 8,870,444 B2 | 10/2014 | Hildreth |
| 9,156,013 B2 | 10/2015 | Hildreth |
| 9,890,310 B2 * | 2/2018 | Hughes et al. ......... B02C 13/02 |
| 2002/0056376 A1 | 5/2002 | Abler |
| 2003/0034406 A1 | 2/2003 | Mishra |
| 2003/0161709 A1 | 8/2003 | Musso et al. |
| 2003/0168535 A1 | 9/2003 | Hollinrake et al. |
| 2004/0052164 A1 | 3/2004 | Smith et al. |
| 2004/0057334 A1 | 3/2004 | Wilmer et al. |
| 2006/0255061 A1 | 11/2006 | Frieze |
| 2006/0266853 A1 | 11/2006 | Gamblem, II et al. |
| 2007/0025179 A1 | 2/2007 | Hildreth |
| 2009/0008598 A1 | 1/2009 | Hoerle et al. |
| 2009/0092001 A1 | 4/2009 | Hildreth |
| 2009/0136330 A1 | 5/2009 | Feller |
| 2009/0155914 A1 | 6/2009 | Hildreth |
| 2009/0173800 A1 | 7/2009 | Perkes |
| 2010/0329071 A1 | 12/2010 | Hildreth |
| 2011/0315797 A1 | 12/2011 | Warchola |
| 2012/0043268 A1 | 2/2012 | Chen et al. |
| 2012/0051982 A1 | 3/2012 | Kois |
| 2012/0107470 A1 | 5/2012 | Nesheim |
| 2012/0269026 A1 | 10/2012 | Hildreth |
| 2013/0094324 A1 | 4/2013 | Hildreth et al. |
| 2013/0099155 A1 | 4/2013 | Nesheim et al. |
| 2014/0170276 A1 | 6/2014 | Nelles et al. |
| 2015/0273417 A1 | 10/2015 | Hildreth |
| 2018/0118989 A1 * | 5/2018 | Hughes et al. ......... B02C 13/02 |

OTHER PUBLICATIONS

Cargill Deicing Technology, "Automation Improves Brine Quality," AccuBrine™ Case History, at least by Dec. 2008.
Cargill Deicing Technology, AccuBrine™ Automated Brine Maker, sellsheet, Apr. 2006.
Varitech Industries, Inc. "HCSB1400-SS Stainless Steel Brine Unit," Sales Brochure, at least by Dec. 2009.
U.S. Appl. No. 13/656,412, filed Oct. 19, 2012.
U.S. Appl. No. 61/549,504, filed Oct. 20, 2011.

* cited by examiner

BRINE GENERATION SYSTEM

CROSS-REFERENCE TO RELATED APPLICATIONS

This patent application is a continuation-in-part of U.S. patent application Ser. No. 13/656,412, filed on Oct. 19, 2012, which, in turn, claims the benefit of priority to U.S. Provisional Patent Application No. 61/549,504, filed on Oct. 20, 2011, which are both incorporated in their entireties herein by reference.

TECHNICAL FIELD

This patent disclosure relates generally to systems and methods for generating brine for the treatment of roadways subject to snow and ice and, more particularly, to a system and method for rapidly generating brine.

BACKGROUND

Brine is a combination of water and salt crystals—such as rock salt—in an aqueous solution comprising approximately one part salt crystals and approximately three parts water, and is used for treating roadways subject to snow and ice. When applied to the roadway, brine can provide an anti-icing layer that prevents bonding between the roadway and ice, facilitating ice and snow removal. The use of brine can often reduce the need to use salt and sand to limit ice formation on roadways, which can lessen environmental damage. Because brine can be applied before a snow or ice storm, it can reduce labor costs by allowing road treatment during regular business hours.

Brine is currently prepared in tanks with open tops through which salt may be loaded. The salt is supported above the bottom of the tank by horizontal screens. Nozzles about the upper lip of the tank may then be used to spray water over the surface of the salt, the latter of which may percolate downward through the screens into the lower portion of the tank. The water may be collected at the bottom of the tank and recirculated one or more times through a second set of nozzles until the desired salinity is obtained. An example of this design is taught by U.S. Pat. No. 7,810,987, which issued on Oct. 12, 2010.

As noted in the above-cited patent, the salt is often contaminated with dirt and silica which can be abrasive and can cause excess wear on pumps, flow meters, and valves in the delivery chain of the brine. Accordingly, these contaminants are allowed to settle in the tank at a point below the brine outlet. Cleaning the sediment from the tank can be facilitated by sloping the tank bottom to a sump channel leading to a sediment outlet in the tank. In use, the tank is drained (possibly without removal of the salt) and spray nozzles are used to force the sediment through the channel and out the sediment outlet.

Obtaining the necessary salinity using such systems can be significantly delayed by the time it takes to recirculate the brine for multiple passes through the salt. Cleaning the sediment from the tank is time-consuming and requires that the machine be drained and thus remains off-line for a significant period of time. Substantial sediment may accumulate in a few hours of operation, thus significantly affecting the throughput of the device.

Furthermore, typically the entity charged with maintaining the roadways of a given region produces brine at a single central facility and then transports the brine to multiple local facilities distributed over the region. Brine production may be carried out at a single central facility for several reasons. For example, road maintenance organizations may prefer to expend the resources related to operating a brine production apparatus at only a single location rather than at several locations. However, the cost of transporting brine can be considerably higher than the cost of producing brine.

It will be appreciated that this background description has been created to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

Embodiments of the present disclosure are directed to a high throughput brining system that immerses the freshwater nozzles in the salt near an obstructing divider to create an extreme erosion zone within the salt. This high turbulence zone can provide an accelerated entry of the salt into solution. In addition, the embodiments of a brine generating system according to principles of the present disclosure can provide sediment filtering that catches a significant portion of the sediment at a point above the bottom of the tank allowing the sediment to be automatically discharged periodically, without fully draining the tank and even during operation of the brining system. In this way, a full cleaning of the sump can be delayed, thereby increasing the up-time of the system.

In some embodiments, a brine generation system includes a tank with an upper opening configured for receiving salt crystals and a divider separating the tank into a salt crystal holding upper portion and a brine holding lower portion. The divider is adapted to resist movement of salt crystals from the upper portion to the lower portion but be permeable to allow the brine solution to fall into the lower portion from the upper portion through the divider. A fluid conduit is disposed within the upper portion. The fluid conduit includes at least one water jet adapted to inject a stream of water provided through the fluid conduit. The stream of water is configured for discharge through the water jet in a direction that is downward into the volume of the tank. An outlet is positioned in the lower portion of the tank for withdrawing the brine solution. In some embodiments, a set of water jets receives fresh water and discharges it downward into the tank at a point below an upper third of a volume of the upper salt crystal holding portion whereby the water jets may be surrounded by salt crystals.

In other embodiments, a brine generation system includes a tank having an upper opening for receiving salt crystals to fill the tank. A divider separates the tank into an upper salt crystal holding portion and a lower brine holding portion. The divider provides an intermediate channel positioned above the lower brine holding portion. The intermediate channel is adapted for accumulating non-soluble particles that may be mixed with the salt crystals by sedimentation. A set of water jets is disposed within the upper salt crystal holding portion of the tank. The set of water jets is adapted to discharge fresh water or a brine solution into the upper salt crystal holding portion to dissolve salt crystals. A mechanical sweeper is associated with the intermediate channel. The mechanical sweeper is adapted to collect and discharge non-soluble particles from the intermediate channel out of the tank through an opening extending through a wall of the tank. A lower channel is formed below the intermediate channel at a lower position in the lower brine holding portion. The lower channel is adapted for accumulating non-soluble particles found in a brine solution that percolates from the upper salt crystal holding portion when the set of water jets is active. A brine outlet extends through the wall of the tank at an outlet height. The outlet height is above the lower channel and below the intermediate channel. The brine outlet is adapted to withdraw brine solution from the lower portion of the tank.

It is a feature of at least one embodiment of a brine generating system according to principles of the present disclosure to substantially reduce the amount of extra-tank recirculation required to obtain a given degree of salinity.

In embodiments, a divider may include a wall portion adjacent to the water jets for providing a region of circulating water drivable by a force of water from the water jets. It is thus a feature of at least one embodiment of a brine generating system according to principles of the present disclosure to increase the dwell time of turbulent water and salt beyond the limit imposed by simple percolation.

In embodiments, a divider may include a sump channel and an openable port through the tank wall for ejection of particles accumulated in the sump channel. It is thus a feature of at least one embodiment of a brine generating system according to principles of the present disclosure to capture particulates at a point above the bottom of the tank permitting their ejection without full tank draining.

In embodiments, a sump channel may include a mechanical sweeper for moving particles collected in the sump channel out of the openable port in the tank. It is thus a feature of at least one embodiment of a brine generating system according to principles of the present disclosure to permit the ejection of sediment without dilution of existing brine.

In embodiments, a mechanical sweeper may be an auger extending substantially horizontally along the sump channel. It is thus a feature of at least one embodiment of a brine generating system according to principles of the present disclosure to provide a compact apparatus for mechanically removing sediment.

In embodiments, an auger and an openable port may be electronically controllable for automatic ejection of accumulating particles. It is thus a feature of at least one embodiment of a brine generating system according to principles of the present disclosure to allow optimization of the cycle of sediment removal for minimum downtime.

In embodiments, at least a portion of a sump channel forming a lowermost portion in a divider may be a screen. It is thus a feature of at least one embodiment of a brine generating system according to principles of the present disclosure to provide a system concentrating sediment for removal.

In embodiments, a valve plate may divide an upper portion into an upper erosion chamber receiving water directly from jets and a portion of a sump channel below the upper erosion chamber, a valve plate controlling passage of material from the upper erosion chamber to the lower sump channel. It is thus a feature of at least one embodiment of a brine generating system according to principles of the present disclosure to controllably limit drainage of brine through the sump to maximize sediment retention without adversely reducing dwell time of liquid in the extreme erosion zone.

In embodiments, a brine generation system may further include a second screen above and not covering a sump channel and presenting a substantially vertical surface to resist accumulation of particles. It is thus a feature of at least one embodiment of a brine generating system according to principles of the present disclosure to provide a decanting route for brine from the extreme turbulence zone.

In embodiments, a brine generation system may include a third screen covering a sump channel above a second screen passing larger particles than a second screen. It is thus a feature of at least one embodiment of a brine generating system according to principles of the present disclosure to block extremely large damaging particles such as rocks and sticks.

In embodiments, a brine generation system may further include a secondary sump at a lowermost portion of a tank below a sump channel for accumulating particles passing through a divider. It is thus a feature of at least one embodiment of a brine generating system according to principles of the present disclosure to permit removal of non-soluble particulates that escape the intermediate trap.

In embodiments, a port openable through a tank wall may provide for the ejection of particles accumulated by a secondary sump. It is thus a feature of at least one embodiment of a brine generating system according to principles of the present disclosure to allow simple removal of the fine particulates when the tank is drained.

In embodiments, a secondary sump may be a horizontally extending channel sloping along its length and further including an ejector for driving accumulated particles within a secondary sump out of an openable port. It is thus a feature of at least one embodiment of a brine generating system according to principles of the present disclosure to promote complete cleaning of the tank with reduced water usage.

In embodiments, an ejector comprises a pressurized water nozzle. It is thus a feature of at least one embodiment of a brine generating system according to principles of the present disclosure to provide a simple method of periodic cleaning that may occur after draining.

In another aspect of the present disclosure, embodiments of a method for generating a brine solution useful for treating roadways against ice accumulation thereon are described. In one embodiment, a tank that is segmented into upper and lower portions is provided. The upper portion is adapted for containing salt crystals, and the lower portion is adapted for containing the brine solution. One or more water jets operate within the upper portion when salt crystals are present in the upper portion. The water jets provide water streams aimed towards the salt crystals such that the water jets dissolve salt crystals to form the brine solution in the upper portion. The brine solution from the upper portion is allowed to percolate through a permeable divider that has a non-permeable section and that separates the upper and lower portions such that the brine solution is collected in the lower portion. The water jets operate such that at least a portion of the water streams impinges the non-permeable portion of the divider to create a turbulent region adapted to promote salt crystal dissolution. One or more screens are provided in the divider through which the brine solution passes such that any non-soluble particles present within the salt crystals can collect on at least one screen. A sweeper device adapted to collect non-soluble particles from the at least one screen and eject the collected non-soluble particles through an openable port extending through a wall of the tank is operated.

In another aspect of the present disclosure, embodiments of a brine generation system are described. In embodiments, the brine generation system includes a tank unit, a freshwater conduit, and a salinity control system.

The tank unit includes a tank body and a divider. The tank body defines a volume therein and has an upper opening in communication with the volume for receiving salt crystals therethrough. The tank body defines a brine outlet in communication with the lower portion of the tank body. The divider is disposed in the tank body and separates the volume within the tank into an upper portion configured to hold salt crystals and a lower portion configured to hold a brine solution. The divider is adapted to resist the movement of salt crystals greater than a predetermined size from the upper portion to the lower portion and is adapted to permit the brine solution to pass from the upper portion through the divider to the lower portion by the effect of gravity.

The freshwater conduit is disposed within the upper portion of the tank body. The freshwater conduit includes at least one water jet adapted to discharge a stream of water from the freshwater conduit in a direction toward the divider and the lower portion of the tank body.

The salinity control system is in fluid communication with the brine outlet of the tank body. The salinity control system is adapted to determine a salinity of the brine solution received from the brine outlet and to return the brine solution to the upper portion of the tank body when the salinity is below a predetermined level.

The divider includes a sump channel having an opening in communication with the upper portion of the tank unit. The sump channel is adapted to collect non-soluble particles greater than a predetermined size and is in communication with a sediment discharge port defined in the tank body. The sump channel includes at least a portion that is adapted to permit the brine solution in the sump channel to pass therethrough to the lower portion of the tank unit.

In another aspect of the present disclosure, embodiments of a method for generating a brine solution for treating roadways using a brine generation system are described. The brine generation system includes a tank unit having a tank body and a permeable divider.

Salt crystals are deposited in an upper portion of the tank body. The tank body is segmented into the upper portion and a lower portion by the permeable divider. The divider is adapted to resist the movement of salt crystals greater than a predetermined size from the upper portion to the lower portion and is adapted to permit the brine solution to pass from the upper portion through the divider to the lower portion by the effect of gravity. The upper portion defines an upper volume and includes at least one water jet positioned within the lower two thirds of the upper portion of the tank body.

A stream of water is injected through the at least one water jet within the upper portion of the tank body such that the water contacts salt crystals within the upper portion of the tank body to form the brine solution in the upper portion of the tank body. The brine solution is allowed to pass from the upper portion of the tank body through the permeable divider and flow into the lower portion of the tank body.

Further and alternative aspects and features of the disclosed principles will be appreciated from the following detailed description and the accompanying drawings. As will be appreciated, the brine generating systems and methods for using the same disclosed herein are capable of being carried out and used in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Figure 1:
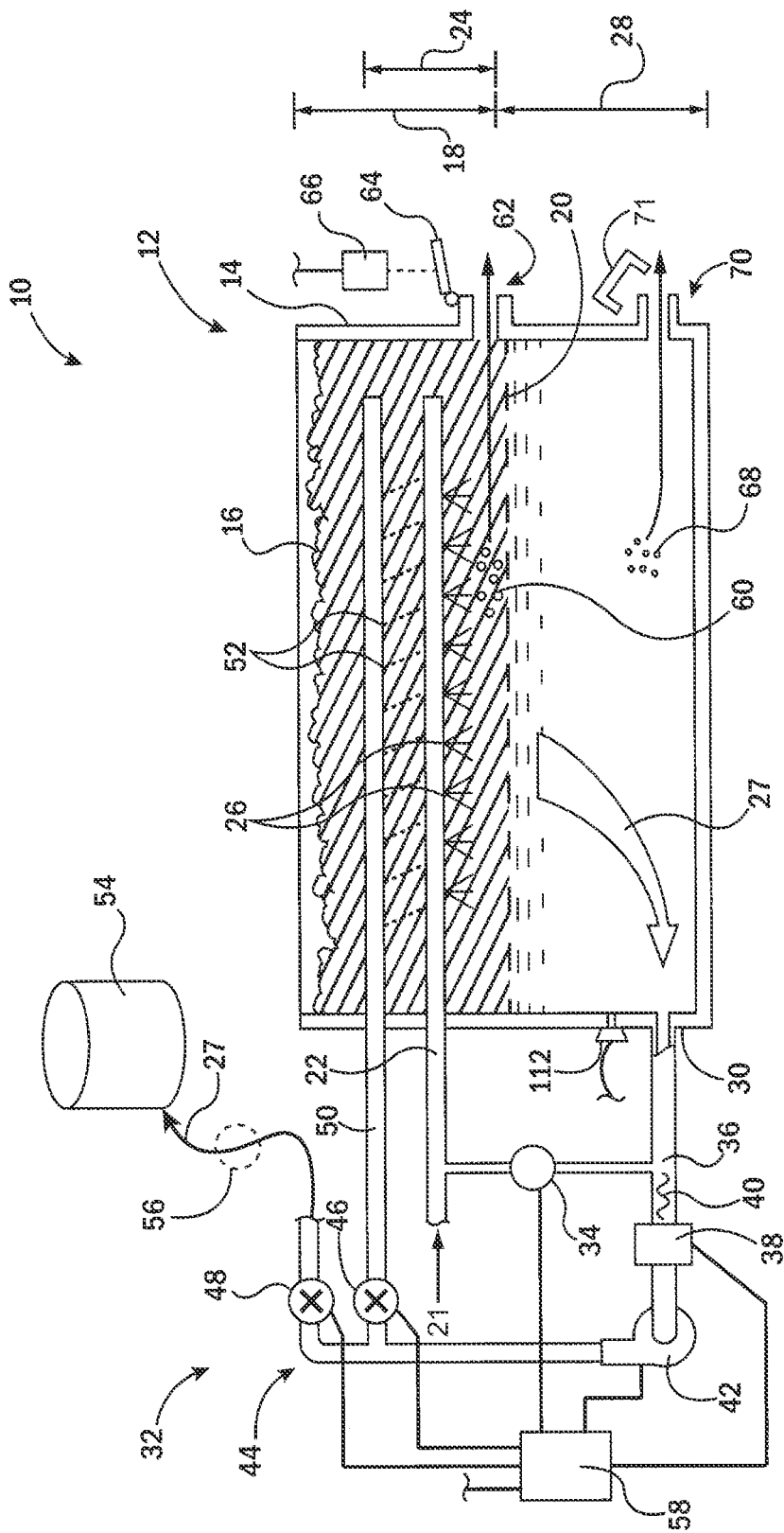
FIG. 1 is a simplified side elevational view in partial cross-section of an embodiment of a brining system constructed according to principles of the present disclosure showing a location of fresh water jets in an upper portion of the tank as buried in salt and close to a divider to create an extreme erosion zone near the divider and further showing two levels of sediment removal.

Referring now to FIG. 1, an embodiment of a brine generation system 10 constructed according to principles of the present disclosure can include a tank unit 12 providing a tank 14, for example, made of stainless steel and having an open top through which rock salt 16 or other similar material such as calcium magnesium acetate (CMA) pellets and other salt-containing materials that will dissolve in water (referred to herein, collectively, as "salt crystals" or "crystals of salt") can be received. In alternative embodiments, other non-corrosive materials such as fiberglass, polymers and the like can be used. An exemplary, but non-limiting, capacity of the tank 14 can be six to eight cubic yards.

As will be described in greater detail below, the salt 16 is generally contained in a salt-holding upper portion 18 as constrained by a divider 20. A freshwater source 21 can feed a freshwater manifold 22 extending horizontally into the upper holding portion 48 in an inflow region 24 below an upper third of the volume of the upper holding portion 48, such that the freshwater manifold 22 can be surrounded by crystals of salt 16. The manifold 22 provides a series of nozzles 26 discharging high-pressure streams of freshwater downward into the salt 16.

Brine 27 collects beneath the divider 20 in a brine-holding lower portion 28 of the tank 14 and can be extracted through a brine extraction port 30 above the bottom of the tank 14 in a wall of the tank 14 and communicating with a brine conduit 36. The brine holding lower portion 28 can, for example, hold up to 380 gallons of brine. The brine 27 can be received by a salinity control system 32 which is adapted to adjust the brine 27 for proper salinity.

Specifically, the salinity control system 32 is adapted to controllably mix the brine 27 as received from the brine extraction port 30 with fresh water from freshwater metering valve 34 communicating between the manifold 22 and the brine conduit 36. If the salinity is too high, as checked by a salinity sensor 38 downstream from a freshwater inlet 39 from the freshwater metering valve 34 after passing through a mixer 40 within the brine conduit 36, additional water can be added automatically. The salinity sensor 38 can be any suitable sensor adapted to allow a controller 58 of the salinity control system 32 to determine the salinity of the brine, for example, an electrical salinity gauge providing accuracy of as much as 0.01% or a density sensor adapted to measure the density of the brine, which can be converted to a salinity concentration by a PLC.

The brine 27 measured by the salinity sensor 38 can be received by a pump 42 to pass to a valve bank 44 having a recycle valve 46 and a tank valve 48. The recycle valve 46 conducts the brine 27 to a return manifold 50 that can extend generally parallel to the freshwater manifold 22 but displaced therefrom in the inflow region 24. The return manifold 50 can include a series of orifices 52 which can be nozzles or simply low-pressure openings that return the brine 27 to the tank 14 to increase its salinity.

Thus control of the freshwater metering valve 34 and the recycling provided by the recycle valve 46 can be used to adjust the salinity of the brine 27 received by the pump 42. One or more flow sensors (not shown) can also be placed in the brine conduit 36, the freshwater manifold 22, or the return manifold 50 for further control input.

The tank valve 48, when open, can permit the conveyance the brine 27 to a storage tank 54 by way of a mixing station 56 in some embodiments. The mixing station 56 can mix the brine 27 with other additives of types known in the art. Each of the valves 34, 46, 48, and the pump 42 can be electrically controlled by pneumatic valves controlled by the controller 58 (such as a programmable logic controller) for automatic operation as will be described herein, based on readings obtained from the salinity sensor 38, flow sensors (not shown) and inputs received from the operator via a control panel 259 (see. e.g., FIG. 5).

The tank 14 provides for two stages of sediment collection. Such sediment includes non-soluble particles that can be mixed with the salt crystals loaded into the tank 14. A first stage of sedimentation collection occurs above the bottom of the tank 14 near the divider 20 and provides for a capture of intermediate particulates 60 which can be automatically discharged through an intermediate sediment discharge port 62 at one end of the tank 14. The intermediate sediment discharge port 62 can have an electronically-controllable port hatch 64 controlled by an actuator 66 which is in communication with the controller 58 for automatic discharge of the intermediate particulates 60 at regular intervals.

Fine particulates 68 can settle to the bottom of the tank 14 and be discharged through a second sediment discharge port 70 below the intermediate sediment discharge port 62. The second sediment discharge port 70 can have a manually-removable cap or valve 71. The discharge ports 62, 70 are shown on the same side of the tank 14 for clarity; however, in a preferred embodiment, the second sediment discharge port 70 is on the same side as the brine extraction port 30 preventing interference in the collection of sediment between the two ports 64, 70.

Figure 2:
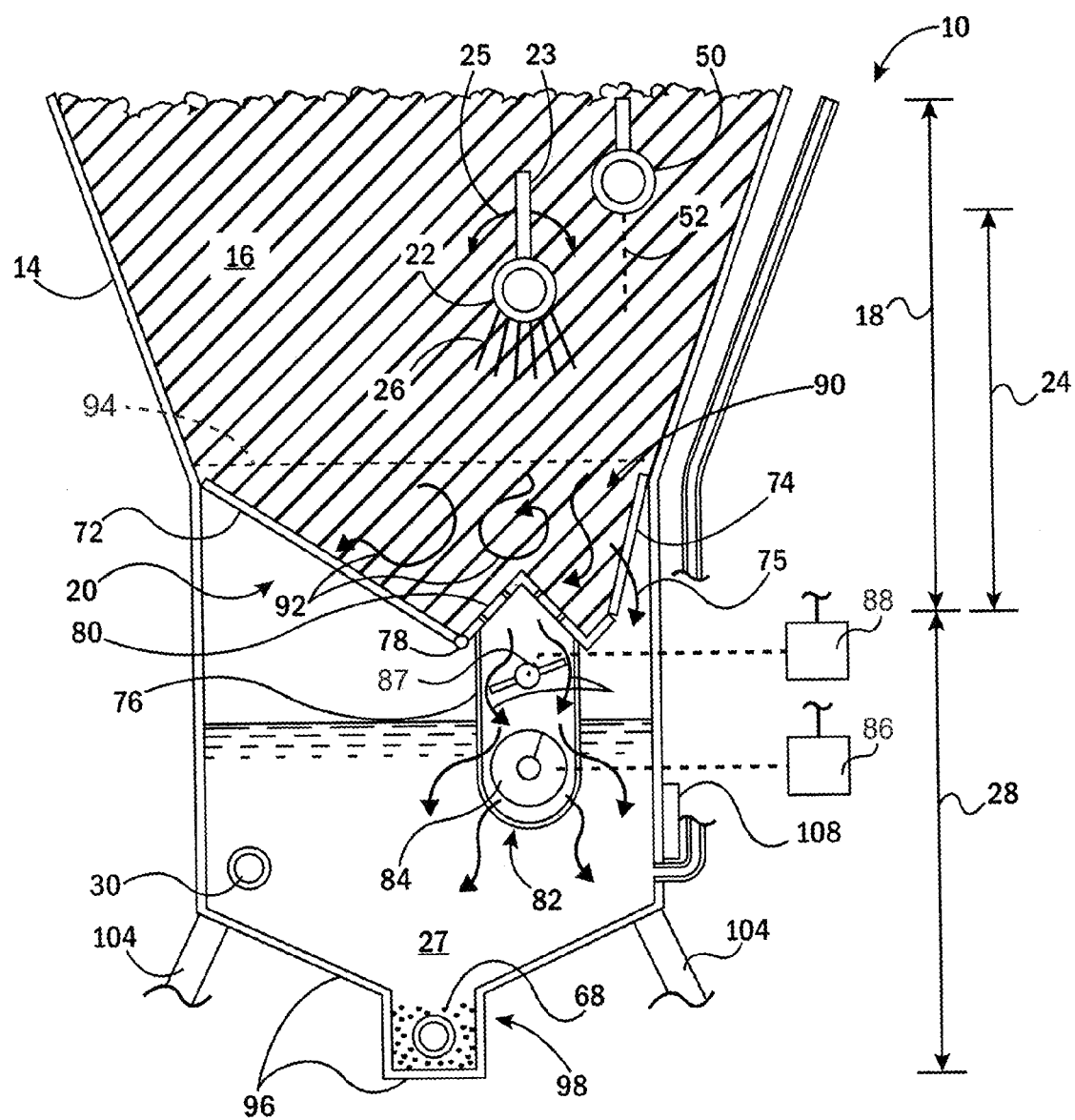
FIG. 2 is an elevational view in cross-section of the tank of FIG. 1 showing details of the divider for creating the extreme erosion zone and a first sediment collection sump for collecting sediment above the bottom of the tank and a second sediment collection zone at the bottom of the tank.
Figure 3:
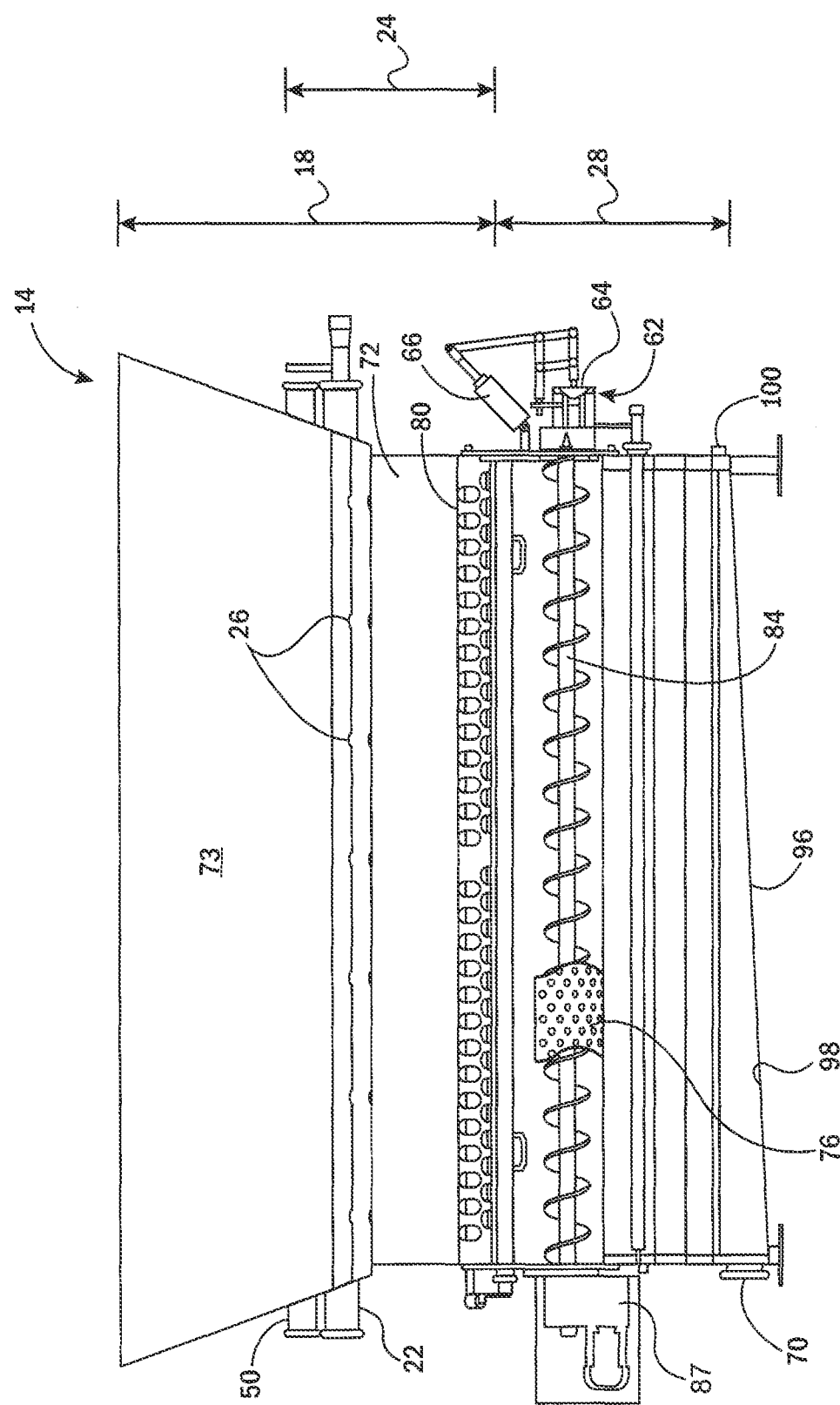
FIG. 3 is a detailed side elevational view similar to FIG. 1 showing an auger of the first sump for automatically removing material therefrom and a rock and stick filter positioned above the first sediment collection sump.

Referring now to FIGS. 2 and 3, the upper portion 18 of the tank 14 can flare outward to provide a hopper 73 for receiving salt 16 from a back loader, conveyor or the like as discharged downward into the tank 14. The salt 16 is then guided to the divider 20 which provides a first inwardly sloping wall 72 and opposed second inwardly sloping wall 74 converging in a downward direction to a sump channel 76. The first sloping wall 72 and second sloping wall 74 thereby approximate a V channel having the sump channel 76 extending downward from its lower vertex. The first sloping wall 72 can be hinged about a hinge point 78 allowing its outer edge to be raised away from a wall of the tank 14 for access to the lower portion 28 of the tank 14 when salt 16 is removed. The second sloping wall 74 provides generally a screen that is permeable to liquid, allowing the latter to pass generally horizontally therethrough as indicated by arrow 75 but resisting the passage of the larger salt particles. This screen can have, for example, 5/32 inch (4 mm) holes staggered on a 3/16 inch (4.75 mm) grid. The vertical extent of the screen of the second sloping wall 74 helps resist the accumulation of particulate matter against the screen, as the particulate matter migrates generally downward toward the sump channel 76.

Referring also to FIG. 3, an upper open end of the sump channel 76 communicating with the upper portion 18 can be covered by a rock guard 80 having relatively large openings (on the order of 2 inch (50 mm) diameters) intended to prevent passage of large rocks or sticks or the like into the sump channel 76.

Referring to FIGS. 2 and 3, the walls of the sump channel 76 can be formed of a perforated sheet of stainless steel formed in an upwardly facing U-shaped cross-section to provide a radiused portion 82 conforming to an outer periphery of a horizontally extending auger 84. The perforations will generally have similar openings to the openings of the screen of the second sloping wall 74, both of which can be much smaller than the openings of the rock guard 80. An auger 84 can be provided in the sump channel 76 which is a screw type helix having a cylindrical swept volume formed of molded polypropylene or stainless steel sections assembled on a stainless steel arbor. Rotation of the auger 84 by a gear motor 86 (electronically controllable by the controller 58 shown in FIG. 1) scrapes the inner surface of the radiused portion 82 to transport sediment trapped by the sump channel 76 out of the intermediate sediment discharge port 62 when the port hatch 64 is opened. It will be appreciated that this operation of the auger 84 can be conducted without a complete draining of the tank 14 of brine 27. When significant sediment has accumulated in the sump channel 76, the auger 84 can be operated even with the level of the brine 27 slightly above the auger 84 without undue loss of brine through the intermediate sediment discharge port 62. This allows continued operation of the system 10 without the need to drain the tank 14 and go off-line while substantially decreasing the amount of sediment that will accumulate at the bottom of the tank 14.

Referring still to FIG. 2, positioned within the sump channel 76 and above the auger 84 is a plate valve 87 controllable by an actuator 88 that can also be controlled by the controller 58 (shown in FIG. 1). The plate valve 87, when closed, substantially blocks access to the sump channel 76 from above the divider 20, allowing more access as the plate valve 87 is opened. The result is that the amount of fluid flow indicated by arrows 89 from the upper portion 18 of the tank 14 into the sump channel 76 can be controlled to permit the collection of intermediate size particulates 60 in the sump channel 76 without providing substantial loss of brine 27 therethrough. The result of the placement of the nozzles 26 of the freshwater manifold 22 adjacent to the divider 20 is to create an extreme erosion zone 90 providing for highly turbulent flow 92 within a pool 94 of brine 27 above the divider 20. The angle of the nozzles 26 can be adjusted about an axis of the manifold 22 via an exterior handle 23 as indicated by arrows 25. By control of the relative flow through the nozzles 26 and the setting of the plate valve 87, the dwell-time for liquid above the divider 20 can be controlled, allowing desired salinity to be obtained with reduced need to recirculate the brine 27 through the system which can decrease the rate at which the system can produce the brine solution 27. In the illustrated embodiment, the system is configured to provide at least exceed 100 gallons (380 L) of brine solution per minute.

Referring still to FIGS. 2 and 3, a bottom wall 96 of the tank 14 can provide for an upwardly open channel 98 being a lowermost portion of the bottom wall 96. The bottom wall 96 outside of the channel 98 can slope toward the channel 98 to facilitate the collection of fine particulates 68 therein. The channel 98 itself slopes downward toward the discharge port 70 at one end of the tank 14 to facilitate the migration of fine sediment toward the discharge port 70. A clean-out port 100 opposite the discharge port 70 across the channel 98 can be provided for the introduction of high-pressure water through a nozzle to force sediment along the channel 98 out of the discharge port 70. Additional manifolds and nozzles (not shown in FIG. 2) can direct water jets down the slope portions of the bottom wall 96 outside of channel 98 to assist in this discharge process. This sediment removal process typically requires draining the brine 27 from the tank 14 and thus is desirably performed less frequently than operation of the auger 84 described above.

Figure 4:
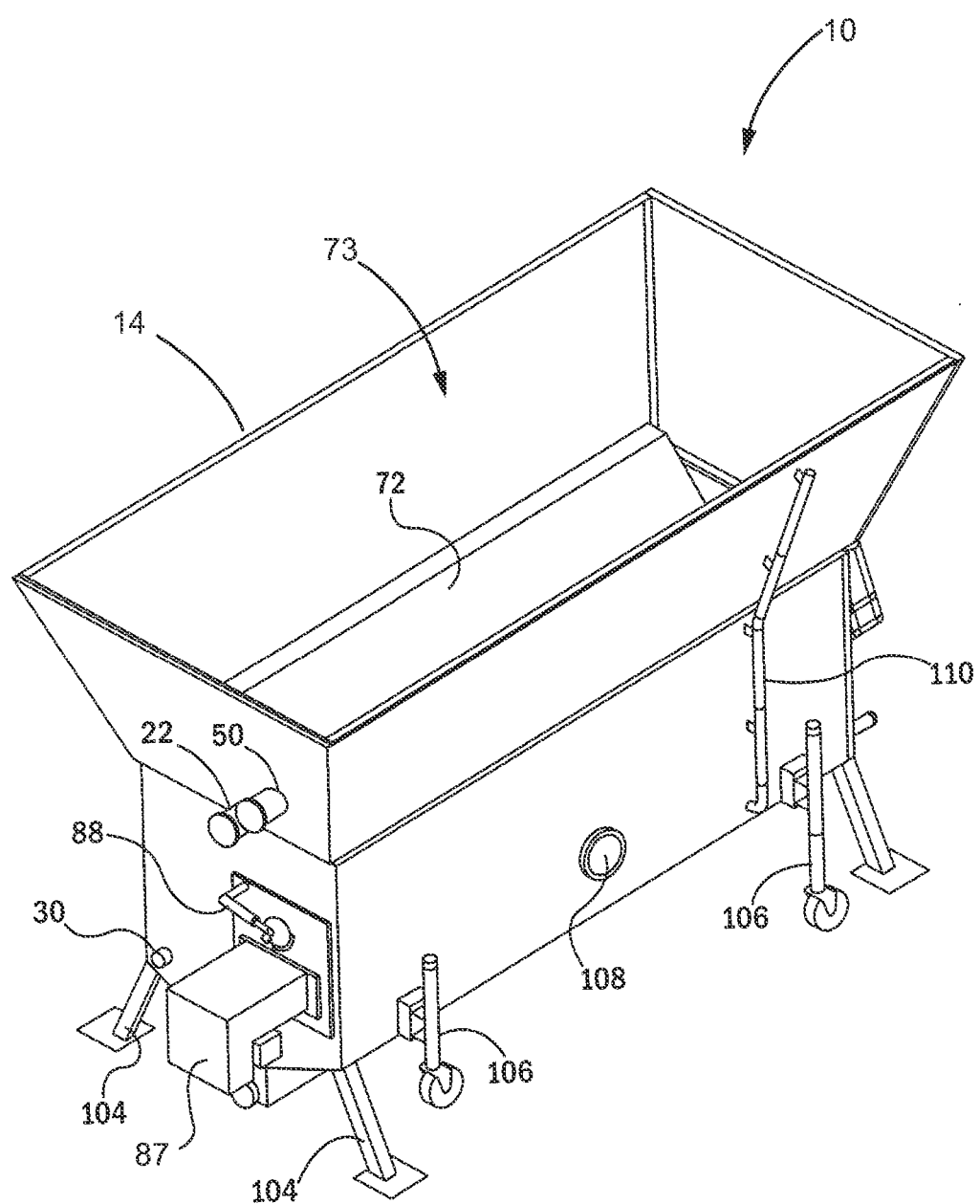
FIG. 4 is a perspective view of an embodiment of a tank constructed according to principles of the present disclosure showing relative locations of a freshwater manifold and recirculation manifold.

Referring now to FIG. 4, the tank 14 can be supported on outwardly splayed legs 104 fixedly attached to the bottom wall 96. Retractable caster units 106 can be lowered to allow movement of the tank 14 by lifting it from a surface in contact with the legs 104. A clear viewport 108 is provided in one side of the tank 14 approximately on level with the brine extraction port 30 to allow monitoring of the sediment buildup of fine particulates 68. A clear, sight-tube type water height gauge 110 can be placed on the side of the tank 14 showing a brine level height in the lower portion 28. This water height gauge 110 can be augmented by a pressure sensor type water height gauge 112 (shown in FIG. 1 communicating with the controller 58) to allow automatic adjustment and control of the brine height in the lower portion 28 of the tank 14.

During operation, the controller 58 can adjust the salinity of the brine 27 discharged to the tanks 54 and periodically run the auger 84, possibly with adjustment of the brine level downward below the port hatch 64, per the water height gauge 112, before the auger 84 runs. A feedback control loop (for example implementing a PID loop) can be used to control the plate valve 87 to minimize the need for recycling brine through return manifold 50 increasing the net throughput of the device.

Embodiments of the present disclosure are directed to a portable brine generation system adapted to be transported to multiple local road maintenance facilities or stations where brine can be prepared and, if desired, stored for future use. It can be more cost effective to prepare brine within a desired application area rather than to prepare brine at a central location and then transport the brine as an aqueous solution from the central location to each desired application area.

The portable brine generation system can use water and salt crystals provided at the local road maintenance stations to prepare the brine on site at the local road maintenance station rather than transporting the brine as an aqueous solution from a centralized brine generation site servicing a larger region over a longer distance to the roadways to which the brine will be applied. By producing the brine solution within the region of application, the portable brine generation system can reduce the cost of transporting brine as an aqueous solution over longer distances and avoid the need for a dedicated brine production unit at each local station.

In embodiments, the brine generation system can include a tank unit, a freshwater conduit, and a salinity control system mounted to a mobile platform. Salt crystals and water are mixed in the tank to form brine as an aqueous solution. The salinity control system is adapted to determine a salinity of the brine solution received from the brine outlet and to return the brine solution to the upper portion of the tank body when the salinity is below a predetermined level and to discharge the brine solution when the salinity is at the predetermined level.

In one embodiment, a mobile platform is used to transport the brine generation system between local road maintenance stations. In embodiments, the mobile platform comprises a trailer with at least one ground engagement element, such as a set of wheels, and is configured to be pulled behind a service vehicle. In other embodiments, the mobile platform can be self-propelled.

The portable brine generation system can be adapted to be removably connected to a freshwater source present at the local road maintenance station. Water from the freshwater source can be used by the portable brine generation system to produce the brine.

The portable brine generation system can also use salt crystals present at the local road maintenance station. At each station, the portable brine generation system can be situated in an area accessible to loading equipment configured to deposit salt crystals into the hopper of the tank body of the portable brine generation system. In embodiments, the portable brine generation system can be loaded with salt crystals at a central location and/or another location other than where the brine solution is generated.

In embodiments, the portable brine generation system includes automation controls, including controllers, pumps, actuated valves, and sensors to automate the brine production process and to produce brine having a desired salinity. In embodiments, the mobile platform can include an enclosure configured to house the salinity control system within the enclosure. The enclosure can house various components for facilitating the production of brine by the portable brine generation system. For example, the enclosure may house automation controls, including one or more controllers, salinity measurement devices, one or more pumps for pumping prepared brine solution, and valves for directing the prepared brine solution from the portable brine generation system to one or more storage tanks at the local station or on one or more service vehicles. Housing certain elements within the enclosure of the portable brine generation apparatus can help protect such elements from the inclement weather conditions in which the portable brine generation apparatus frequently operates.

The portable brine generation system can be adapted to selectively transfer the brine it prepares to one or more storage tanks at the local road maintenance station. The brine can also be directly transferred to storage tanks on one or more service vehicles at the local road maintenance station so that the service vehicles may distribute the brine on local roadways.

In embodiments, the portable brine generation system is equipped with an internal combustion engine or other power-generating device to produce a suitable power supply (e.g., electricity) to operate the system. Alternatively, the portable brine generation system can be adapted to be removably connected to a power source (e.g., an electrical service) provided at the local road maintenance station.

In embodiments of the portable brine generation system, the tank unit can be substantially similar, in both construction and functionality, to the tank unit shown and described in FIGS. 1-4. In embodiments of the portable brine generation system, the freshwater conduit is disposed within the upper portion of the tank body as described above. The freshwater conduit can include at least one water jet adapted to discharge a stream of water from the freshwater conduit in a direction toward the divider and the lower portion of the tank body.

In embodiments of the portable brine generation system, the salinity control system is adapted to adjust the salinity of the brine dispensed from the brine generation system as described above. The salinity control system can be adapted to determine a salinity of the brine solution received from the brine outlet and to return the brine solution to the upper portion of the tank body when the salinity is below a predetermined level.

In embodiments, the salinity control system can be in fluid communication with the brine outlet of the tank body. The salinity control system can include a controller, a brine conduit, a sensor, a pump, a valve bank, a return conduit, and a brine discharge port. The brine conduit is connected to the brine outlet of the tank body and is in fluid communication with the lower portion of the tank body. The sensor is adapted to sense a salinity of the brine solution conveyed in the brine conduit and in communicative relationship with the controller to send a salinity signal to the controller indicative of the salinity measured. The pump is in fluid communication with the brine conduit and is adapted to convey the brine solution through the salinity control system. The valve bank is in fluid communication with the pump and in operative relationship with the controller. The return conduit is connected to the valve bank and arranged with the upper portion of the tank unit. The brine discharge port is in fluid communication with the valve bank. The pump is adapted to convey the brine solution from the brine conduit to the valve bank.

Based upon the salinity of the brine solution received by the salinity control system, the controller selectively controls the opening and closing of the valve bank. In embodiments, the controller is adapted to selectively operate the valve bank to direct the brine solution received from the pump to the return conduit for dispensing in the upper portion of the tank body when the salinity measured by the sensor is below the predetermined level and to the brine discharge port for discharging the brine solution received from the pump out of the salinity control system when the salinity measured by the sensor is at a predetermined level In embodiment, the mobile platform includes a support surface and at least one ground-engaging element rotatably mounted to the mobile platform. In an illustrated embodiment, the mobile platform includes four tires rotatably mounted to a pair of axles at a rear end of the platform and a hitch secured to a front end of the platform to facilitate towing the mobile platform by a vehicle.

In embodiments, the tank unit and the salinity control system are disposed on the support surface of the mobile platform. An enclosure can be mounted to the mobile platform, and components of the salinity control system can be disposed within the enclosure.

In embodiments, the brine generation system further comprises a supply station at one or more sites. The supply station is adapted to be removably connected to the freshwater conduit and the salinity control system of the portable brine generation system and is configured to provide a supply of at least one of water, salt, and power.

In embodiments, the supply station includes a water source that is configured to connect to the inlet of the freshwater feed conduit disposed in the upper portion of the tank body. The supply station further can also include a storage tank for receiving brine dispensed from the brine discharge outlet of the salinity control system of the portable brine generation system.

In embodiments, the supply station includes a water source, a supply conduit in fluid communication with the water source and adapted to selectively dispense water from the supply conduit, a storage tank configured to hold the brine solution, and a discharge conduit in fluid communication with the storage tank. The first supply conduit is adapted to be removably coupled to the inlet of the freshwater conduit such that water from the water source is selectively discharged from each water jet of the freshwater supply conduit. The discharge conduit is adapted to be removably coupled to the discharge port of the salinity control system such that the brine solution discharged out of the discharge port from the salinity control system is conveyed through the discharge conduit to the storage tank.

The brine generation system can further comprise a second supply station located at a second site. The supply stations can be substantially similar to each other with respect to their construction and functionality. The second supply station can also be configured to be removably connected to the freshwater conduit and the salinity control system of the portable brine generation system when it is placed in proximity to the second supply station at the second site. In embodiments, the second site is in spaced relationship with the first site such that the second supply station is not able to be connected to the freshwater conduit and the salinity control system when the first supply station is removably connected thereto. In embodiments, the brine generation system includes more than two supply stations.

In embodiments, a roadway administrator responsible for a given area, which is segmented into a number of coverage zones, has at least one supply station positioned with each coverage zone. In embodiments, the size of the coverage zone can be based upon the amount of brine solution a given vehicle in the roadway administrator's fleet can hold and/or the amount of roadway can be covered with brine solution from a given vehicle before its storage tank runs empty.

Figure 5:
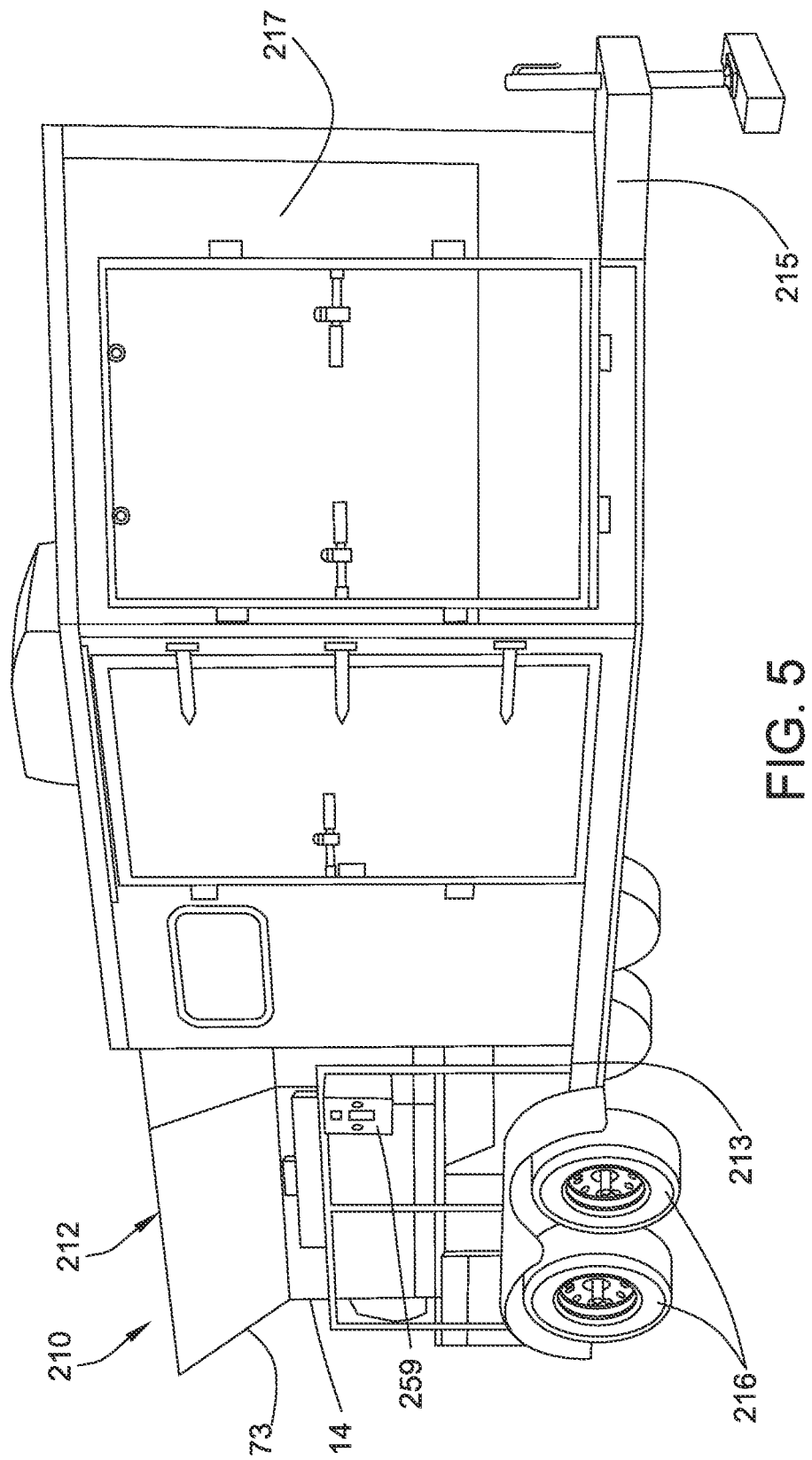
FIG. 5 is a perspective view of another embodiment of a brine generation system constructed according to principles of the present disclosure.

Referring now to FIG. 5, an embodiment of a portable brine generation system 210 is shown. The portable brine generation system 210 includes a tank unit 212 and a salinity control system 232 (see FIGS. 7 and 8) disposed upon a supporting surface 213 of a mobile platform 215. The components of the brine generation system 210 can be secured to the mobile platform 215 using any suitable technique, such as, by being bolted to the mobile platform 215.

In embodiments, the mobile platform 215 includes at least one ground engaging element 216 rotatably mounted to the mobile platform 215. In the illustrated embodiment, the mobile platform 215 comprises a trailer with a number of ground-engaging elements, namely a set of wheels 216, enabling the portable brine generation system 210 to be transported between multiple road maintenance stations to generate brine 27 at each station. In other embodiments, the mobile platform 215 can include a power source and be configured to be self-propelled.

The portable brine generation system 210 can also include an enclosure 217 mounted to the mobile platform 215. The enclosure 217 can be configured to house components of the salinity control system 232 within it (see FIGS. 7 and 8).

Figure 9:
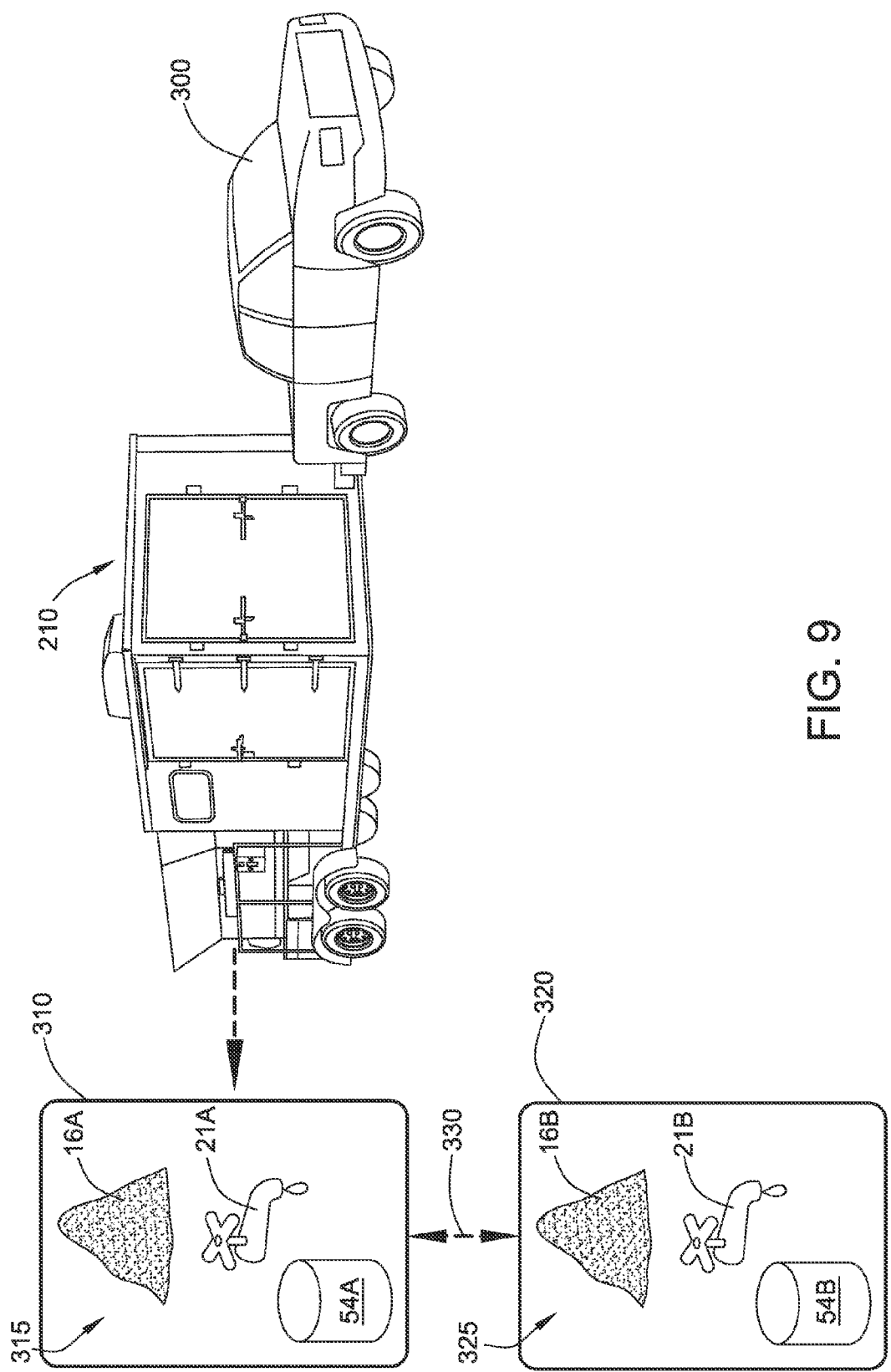
FIG. 9 is a simplified schematic view of an embodiment of a method for generating a brine solution for treating roadways at multiple brine stations using the brine generation system of FIG. 5.
Figure 10:
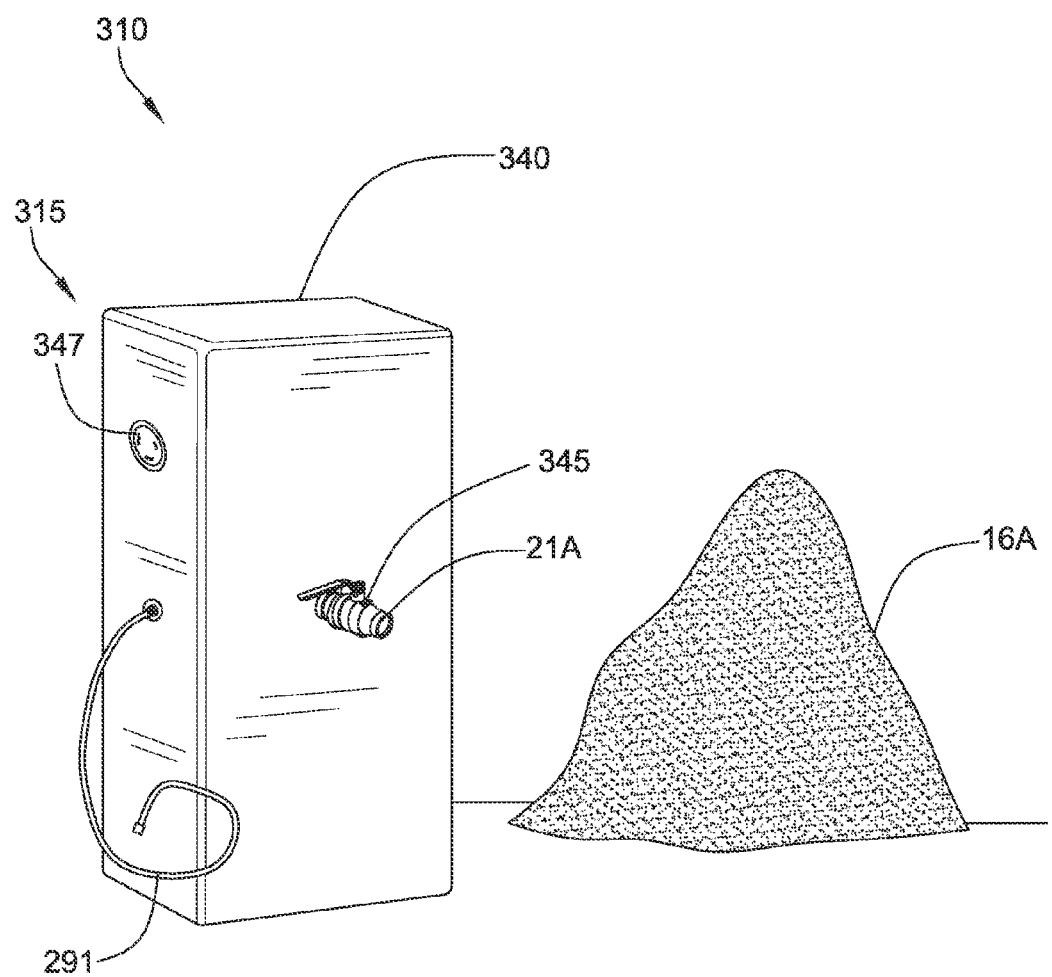
FIG. 10 is a perspective view of an embodiment of a supply cabinet adapted to be removably connected with the brine generation system of FIG. 5.

The tank unit 212 is similar to the tank unit 12 shown in FIGS. 1-4 and includes a tank body 14 and a divider 20 that defines a hopper 73 for receiving salt crystals 16 therein and has a freshwater manifold 22 disposed therein. The salt crystals 16 and water from the freshwater manifold 22 are mixed in the upper portion of the tank body 14 to form brine 27 (as shown in FIGS. 1-2) as an aqueous solution. The salt crystals 16 to be loaded into the hopper 73 may be present at the site at which the portable brine generation system 210 is located, such as at a local road maintenance station. The hopper 73 can be positioned at the site so as to be accessible by loading equipment that may deposit salt crystals 16 in the hopper 73. Similarly, the water provided to the brine generation system 210 via the freshwater manifold 22 can be from an external water source 21 (as shown in FIGS. 9-10) at the site at which the portable brine generation system 210 is located.

Figure 7:
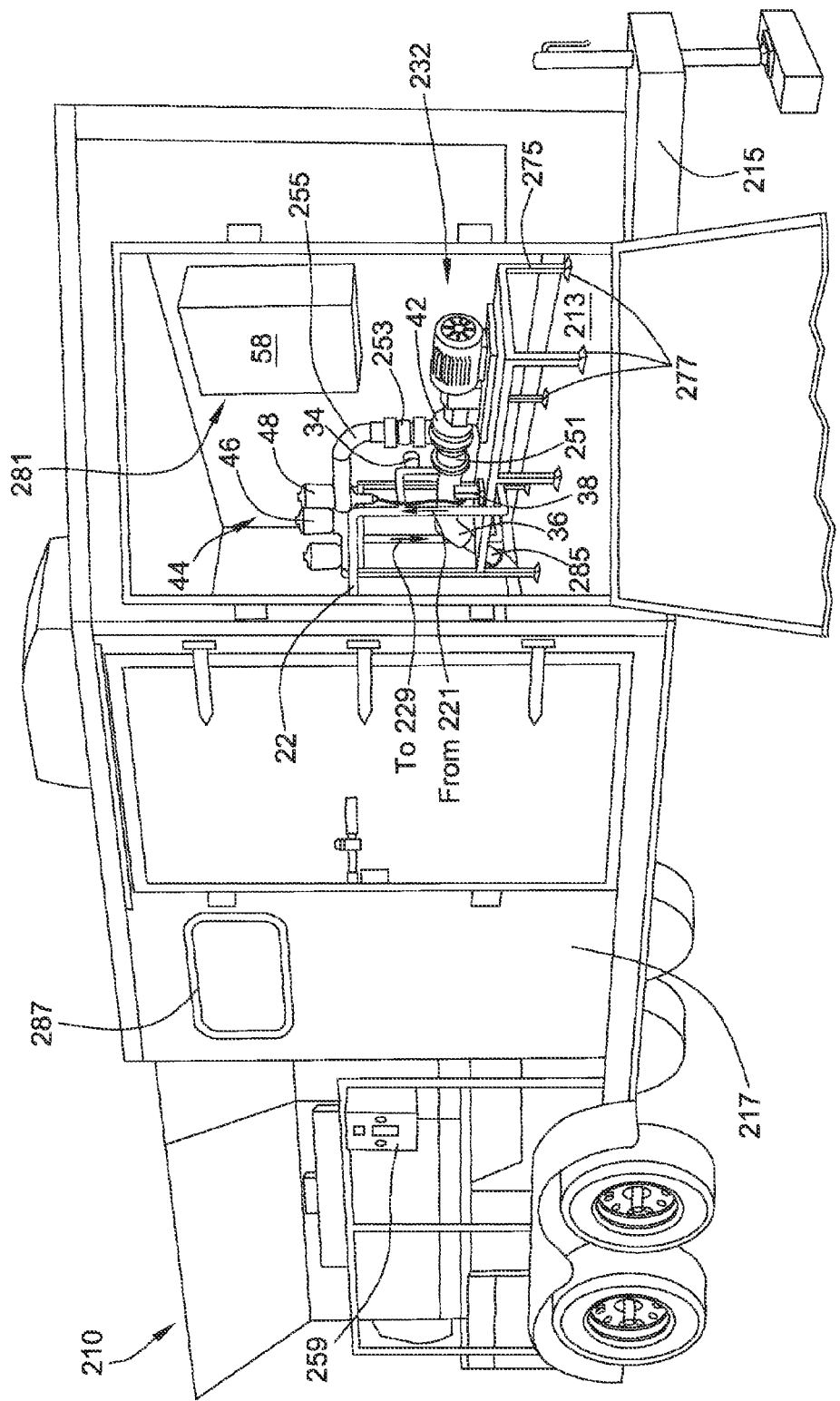
FIG. 7 is a perspective view of the portable brine generation system of FIG. 5, which is similar to the view in FIG. 5 but illustrates an interior of an enclosure thereof.

Referring to FIGS. 5 and 7, the salinity control system 232 can include an operator interface panel 259 which is in electrical communication with the controller 58 of the salinity control system 232. In embodiments, the operator interface panel 259 is mounted to at least one of the tank unit 212, the mobile platform 215, and the enclosure 114 such that it is accessible to an operator of the portable brine generation system 210 from outside the enclosure. The control panel 259 can be configured to permit the operator to control the operation of the portable brine generation system 210. In embodiments, the control panel 259 can include a display equipped with a graphical user interface.

In embodiments, the control panel 259 can be configured to adjustably control a subset of operating parameters of a larger set of operating parameters available for adjustment through the controller 58. For example, the control panel 259 can be configured to permit an operator to adjust the desired salinity of the brine 27 produced by portable brine generation system 210 or the amount of a given additive inserted into the brine solution, but not allow the operator to adjust certain system parameters that may desirably remain constant from station to station or that are more appropriately adjusted by an experienced technician, such as the calibration of the salinity sensor 38, for example. In other embodiments, the user interface of the control panel 259 can include a secure login sequence configured to permit only authorized users to adjust certain operating parameters and or functionality.

Figure 6:
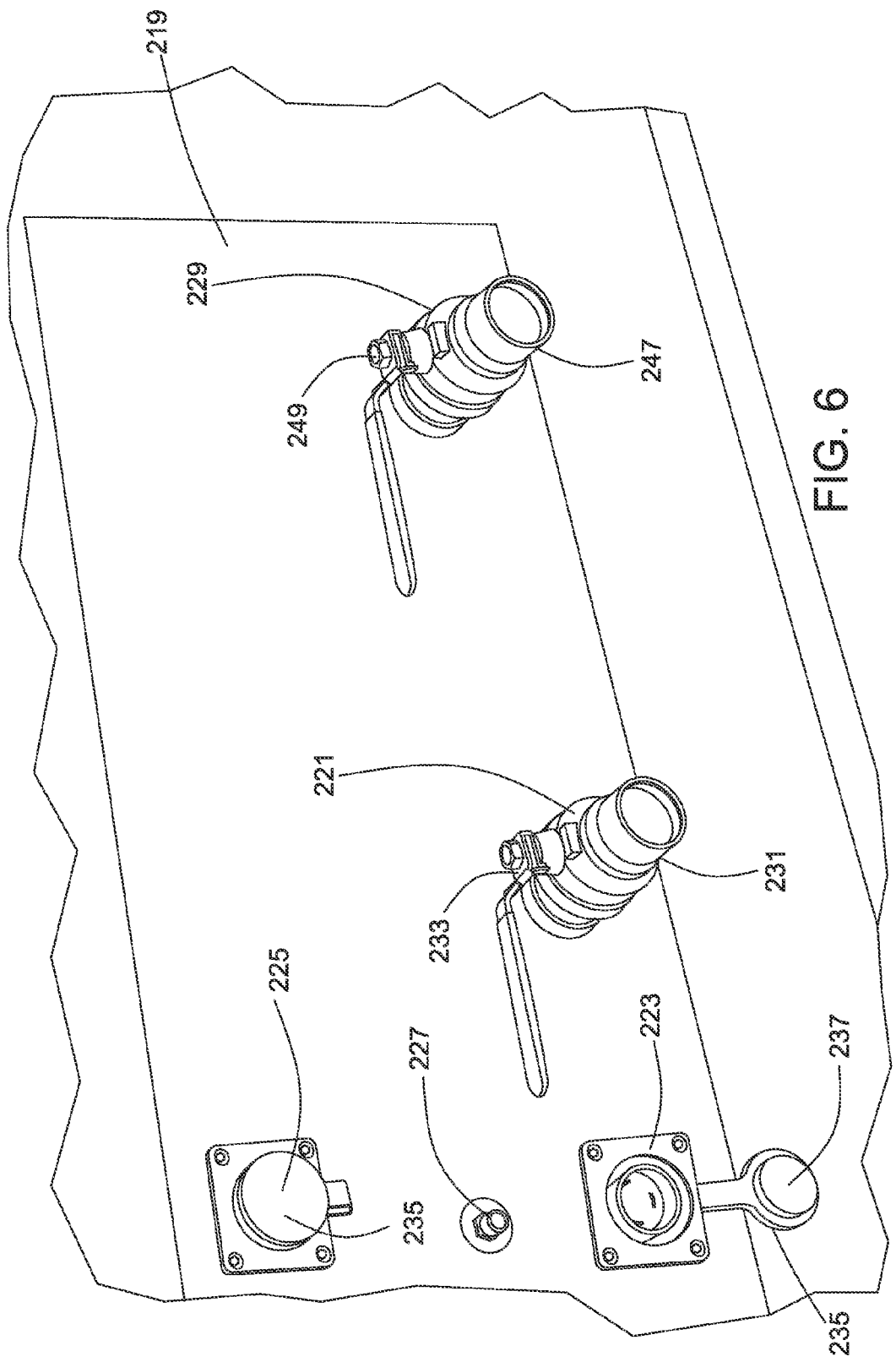
FIG. 6 is an enlarged, fragmentary perspective view of a connection panel of the brine generation system of FIG. 5.

Referring to FIG. 6, a connection plate 219 can be secured to the exterior surface of the enclosure 217 of the portable brine generation system 210. In the illustrated embodiment, the connection plate 219 is located on the side of the enclosure 217 in opposing relationship to the side shown in FIG. 5 (see FIG. 11). The connection plate 219 can be made from any suitable material, such as, stainless steel for example. The connection plate 219 includes several hookups which are configured for removable connection to respective supply sources and discharge conduits when the portable brine generation system 210 is moved to a station at which the portable brine generation system 210 will generate brine 27. The illustrated connection plate 219 includes a freshwater inlet connection 221, a pair of electrical receptacles 223, 225, an air inlet 227, and a brine discharge port connection 229.

Figure 8:
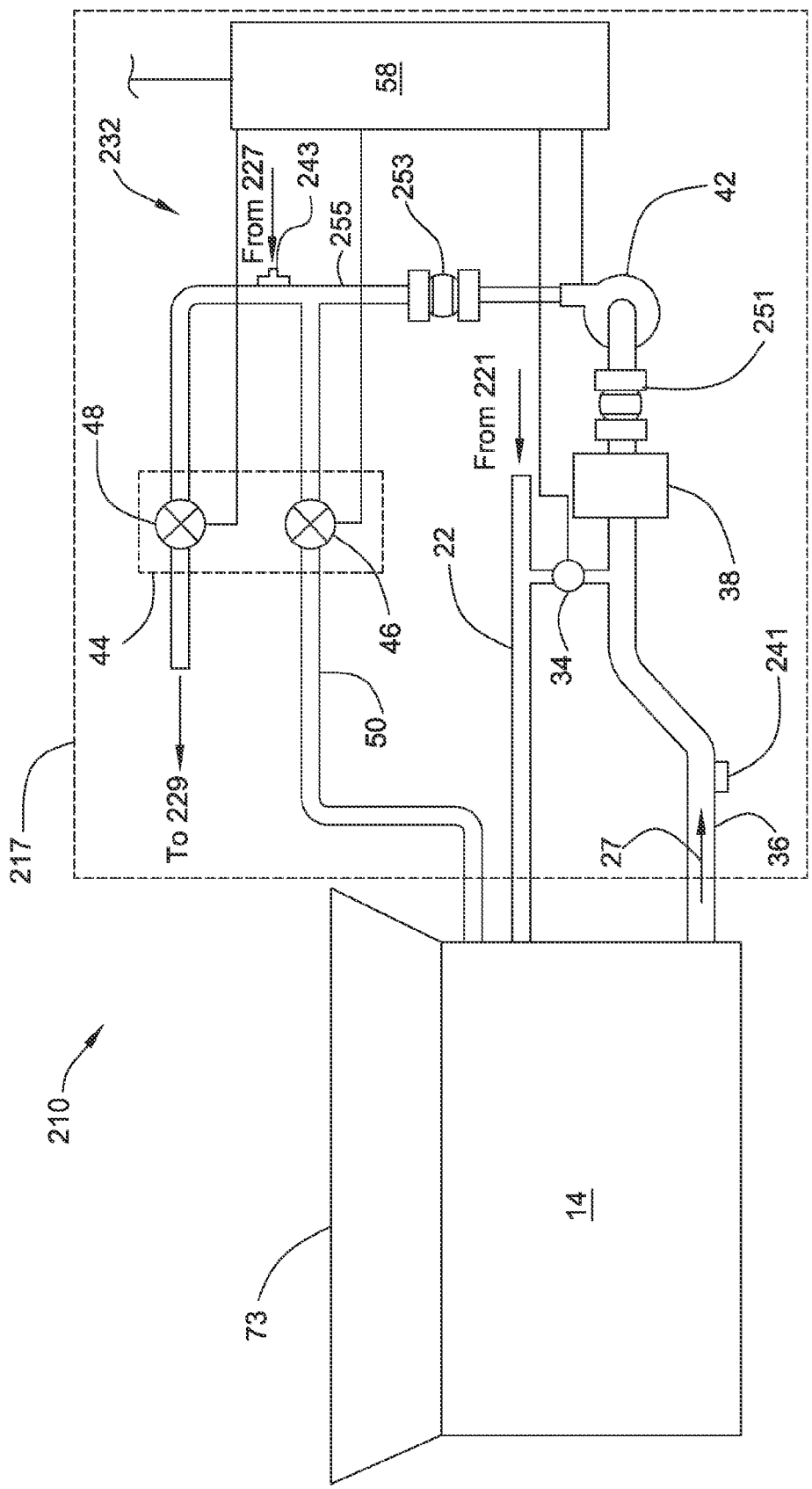
FIG. 8 is a simplified schematic view of components of the brine generation system of FIG. 5.

Referring to FIGS. 6 and 8, the freshwater inlet connection 221 is in fluid communication with the inlet of the freshwater manifold 22. The freshwater inlet connection 221 is adapted to be removably connected to an external freshwater source 21 (see, e.g., FIGS. 9 and 10) located at the station. When connected to the external freshwater source 21, the freshwater inlet connection 221 can selectively provide fresh water to the freshwater manifold 22. Water from the external freshwater source 21 can be directed through a series of nozzles 26 of the freshwater manifold 22 within the tank body 14, discharging high-pressure streams of fresh water downward into salt crystals 16 to form brine 27, as explained above in connection with the brine generation system 10 of FIGS. 1-4. As shown in FIGS. 1 and 8, water entering the freshwater inlet connection 221 can also be directed to the brine conduit 36 via the freshwater metering valve 34 to decrease the salinity of the brine 27 exiting the tank body 14.

In the illustrated embodiment, the freshwater inlet connection 221 includes a coupler 231 configured to be removably connected with a supply conduit 350 of a supply station found at the particular site (see FIG. 11) and a shut-off valve 233. In embodiments, the coupler 231 can be a threaded fitting configured to threadingly mate with an end of the supply conduit. In other embodiments, the coupler 231 can have a different configuration suited to be removably connected to the supply conduit. The supply conduit can be in fluid communication with the supply of fresh water found at the site. The shut-off valve 233 can be provided to selectively open and close the freshwater inlet connection 221 to permit or prevent the flow of freshwater into the tank body 14. In other embodiments, the freshwater inlet connection 221 can have different configurations.

The electrical receptacles 223, 225 can be in electrical communication with one or more of the components of the salinity control system 232, including, without limitation, the controller 58 and the pump 42, for example. While at the site where brine 27 will be generated, the portable brine generation system 210 can be connected to an electrical power source at the site through the electrical receptacles 223, 225. The electrical power provided through the electrical receptacles 223, 225 can be used to power components of the brine generation system 210, including the salinity control system 232, for example.

The illustrated electrical receptacles 223, 225 each includes a manually-removable cover 235, which is tethered to the connection plate 219. Each cover 235 includes a plug 237 configured to sealingly engage the associated receptacle 223, 225 to help prevent water, precipitation, and other contaminants from entering the receptacles 223, 225.

In embodiments, the electrical receptacles 223, 225 can be of a known configuration suited for electrically mating with a standard electrical connector. In embodiments, the electrical receptacles 223, 225 can have a different configuration and can be any suitable electrical connector adapted to be removably connected to an on-site electrical power source. In other embodiments, the brine generation system 210 can include an internal combustion engine or a generator (not shown) disposed upon the mobile platform 215, which can be used to selectively operate the components of the system 210 which use power.

Referring to FIGS. 6 and 8, the air inlet 227 is in communication with the salinity control system 232. The air inlet 227 is configured to be removably connected to an air supply line 291 (see FIG. 11) in communication with a source of pressurized air at the site. The salinity control system 232 can include a drain port 241 in fluid communication with the brine conduit 36 and a vent port 243 disposed vertically above the drain port 241. The drain port 241 is selectively openable to drain fluid in the salinity control system 232. The vent port 243 is selectively openable to admit air into the salinity control system 232 to facilitate the draining of the salinity control system 232 when the drain port 241 is open. To that end, compressed air can be conveyed through the air inlet 227 to the vent port 243. The compressed air can help direct water and/or brine 27 in the salinity control system 232 out the drain port 241 (see FIG. 8) when the portable brine generation system 210 is not planned to be used for a period of time. Purging water and/or brine 27 from within salinity control system 232 can help protect the salinity control system 232 from damage that may result from subjecting residual material within the portable brine generation system 210 to freezing temperatures.

Referring to FIGS. 6 and 8, the brine discharge port connection 229 is in fluid communication with the tank valve 48 of the valve bank 44. The brine discharge port connection 229 is adapted to be removably connected to a suitable discharge conduit 245 (see FIG. 11) which can be used to direct brine 27 into a storage tank 54 or directly into a dispensing tank of a vehicle. When the tank valve 48 is open, the brine solution 27 can flow through the brine discharge port connection 229 out of the enclosure 217.

After being dispensed from the brine discharge port connection 229, the brine 27 can be directed to a storage tank 54 possibly by way of a mixing station 56 (as shown in FIG. 1), which may be used to inject one or more additives, e.g., beet juice, to the brine 27. The storage tank 54 can be used for storing brine 27 from the portable brine generation system 210 at the local road maintenance station. In embodiments, the storage tank 54 comprises one or more storage tanks on one or more service vehicles at the local road maintenance station. The service vehicles carrying brine 27 prepared by the portable brine generation system 210 can be deployed to distribute the brine 27 on local roadways.

In the illustrated embodiment, the brine discharge port connection 229 includes a coupler 247 configured to be removably connected with a discharge conduit 245 of a supply station found at the particular site and a shut-off valve 249. In embodiments, the coupler 247 can be a threaded fitting configured to threadingly mate with an end of the discharge conduit 245. In other embodiments, the coupler 247 can have a different configuration suited to be removably connected to the supply conduit 245. The discharge conduit 245 can be in fluid communication with the storage tank 54 at the site. The shut-off valve 249 can be provided to selectively open and close the brine discharge port connection 229 to permit or prevent the flow of brine into the storage tank 54. In the illustrated embodiment, the brine discharge port connection 229 is substantially identical in construction to the freshwater inlet connection 221. In other embodiments, the brine discharge port connection 229 can have different configurations.

Referring to FIG. 7, at least some of the components of the salinity control system 232 are housed within the enclosure 217 mounted to the mobile platform 215. In embodiments, the pump 42 of the salinity control system 232 is disposed within the enclosure 217. In other embodiments, the enclosure 217 can house the controller 58, salinity measurement devices such as the salinity sensor 38, the pump 42 for pumping prepared brine solution 27 received from the brine conduit 36, and various valves, such as the freshwater metering valve 34 and the recycle valve 46 and the tank valve 48 of the valve bank 44.

In embodiments, the salinity control system 232 can include structure configured to help dampen the mechanical vibration to which the pump 42 is subjected. In the illustrated embodiment, an expansion coupling 251, 253 is respectively located upstream and downstream of the pump 42 (see also, FIG. 8). The upstream expansion coupling 251 connects the brine conduit 36 to the pump 42. The illustrated upstream expansion coupling 251 is part of the brine conduit 36 and is located adjacent the pump 42. The downstream expansion coupling 253 is in fluid communication with, and disposed between, the pump 42 and the valve bank 44. The illustrated downstream expansion coupling 253 is part of the conduit 255 extending between the pump 42 and the valve bank 44 and is located adjacent the pump 42. The upstream and downstream expansion couplings 251, 253 help isolate the pump 42 from, or dampen the effects of, vibration or sudden movement of the mobile platform 215 such as what can occur when the mobile platform 215 is moving between local sites distributed over the region serviced by the roadway administrator.

Referring to FIG. 7, in embodiments, the salinity control system 232 includes a supporting structure 275 having a plurality of vibration-isolation elements 277 adapted to isolate the pump 42 from the supporting surface 213 of the mobile platform 215 to dampen vibration transmission from the mobile platform 215 to the pump 42. Components of the salinity control system 232 housed within enclosure 217 of portable brine generation system 210 may be mounted on the supporting structure 275. The vibration-isolation elements 277 of the supporting structure 275 can be in direct contact with the supporting surface 213 of the mobile platform 215. In embodiments, the vibration-isolation elements 277 can comprise any suitable structure or device adapted to help isolate or dampen the transmission of mechanical vibration. The components of the salinity control system 232 supported by the supporting structure 275 can experience reduced vibration resulting from the movement of the mobile platform 215, e.g., when the portable brine generation system 210 moves between sites.

Referring to FIG. 7, the controller 58 can be mounted on an internal wall surface 281 of the enclosure 217. In embodiments, the controller 58 is electrically connected to the components of the salinity control system 232 which it controls using flexible wiring connections such that movement of the portable brine generation system 210, e.g., when the portable brine generation system 210 moves between sites, does not damage the electrical connections therebetween.

In embodiments, the salinity control system 232 can be adapted to help protect the components of the salinity control system 232 from damage caused by freezing temperatures. For example, in embodiments, the brine conduit 36 can include a translucent portion 285 so that an operator may determine whether brine 27 is present in the brine conduit 36. In embodiments, the translucent portion 285 can be made from any suitable material which permits light to pass therethrough to a sufficient degree to allow an operator to ascertain whether the translucent portion 285 has fluid therein. In embodiments, the translucent portion 285 is transparent.

In the illustrated embodiment, the enclosure 217 has a window 287 constructed so as to permit an operator to view the interior of the enclosure 217 from the outside. In embodiments, the interior of the enclosure 217 can also include suitable lighting which is electrically connected to at least one of the electrical receptacles 223, 225 to allow an operator to selectively illuminate the interior of the enclosure 217 via the lighting.

Referring to FIG. 8, the salinity control system 232 can include one or more selectively openable drain ports 241 positioned to drain water and/or brine 27 from the salinity control system 232. Each selectively openable drain port 241 may be located at a vertical low point, i.e., where brine 27 and or water tends to accumulate within the salinity control system 232 by the effect of gravity when the pump 42 is not operating. In embodiments, a suitable drain line or flexible conduit can be removably connected to the drain port 241 to discharge the material drained from the salinity control system 232 outside of the enclosure 217.

The salinity control system 232 can include one or more selectively openable vent ports 243 located at a vertical high point (i.e., vertically above at least one drain port 241). In embodiments, the vent port 243 can be opened during a draining sequence to help prevent the formation of a vacuum within the salinity control system 232 that may prevent the system 232 from adequately draining. In embodiments, at least one vent port 243 can be selectively placed in pneumatic communication with an air supply line 291 via the air inlet 227 (see FIG. 11). Pressurized air can be introduced into the vent port 243 from the air supply line 291 to help direct water and/or brine 27 in the salinity control system 232 toward the drain port 241 to drain the salinity control system 232.

Referring to FIG. 8, fresh water can enter the enclosure 217 through the freshwater inlet connection 221 and be conveyed to the freshwater manifold 22 which extends into the hopper 73 of the tank body 14. The fresh water is discharged in the tank body 14 from one or more nozzles of the manifold 22 which can be arranged as described above in connection with the brine generation system 10 of FIGS. 1-4. The fresh water is mixed with salt crystals 16 in the hopper 73 to generate the brine solution 27. The brine 27 exits the tank body 14 and enters the brine conduit 36. The pump 42 draws the brine 27 through the brine conduit 36, and directs the brine 27 to the valve bank 44.

If the salinity of brine 27 sensed by the salinity sensor 38 is too high, the controller 58 directs fresh water from the freshwater manifold 22 into the brine conduit 36 via the freshwater metering valve 34. If the salinity of the brine 27 is below a predetermined threshold, the controller 58 can operate the valve bank 44 such that the tank valve 48 is closed and the recycle valve 46 is open to direct the brine solution 27 having a low salinity into the return manifold 50 so that it may pass again through the salt crystals 16 in the hopper 73 of the tank body 14. If the salinity of the brine solution 27 is within the desired range, the controller 58 can operate the valve bank 44 such that the recycle valve 46 is closed and the tank valve 48 is open to discharge the brine 27 from the portable brine generation system 210 via the brine discharge port connection 229. In embodiments, the controller 58 is in electrical communication with the freshwater inlet connection 221 and the brine discharge port connection 229, which are adapted to be controlled by the controller to selectively open and close the connections 221, 229 according to a logical sequence.

Referring to FIG. 9, the portable brine generation system 210 can be moved by a vehicle 300 between a first site 310 having a first supply station 315 where it will be used to generate brine and a second site 320 having a second supply station 325 where it will again be used to generate brine. The first supply station 315 includes a first water source 21A, a first storage tank 54A, and a first supply of salt crystals 16A. The second supply station 325 includes a second water source 21, a second storage tank 54B, and a second supply of salt crystals 16B. The second site 320 is in spaced-apart relation to first site 310. In embodiments, the second site 320 is in spaced relationship with the first site 310 such that the second supply station 325 is not able to be connected to the freshwater conduit and the salinity control system when the first supply station 315 is removably connected thereto.

In embodiments, the distance 330 separating the first and second sites 310, 320 can vary. For example, in one embodiment, the distance between the first site 310 and the second site 320 can be based upon the application range of a service vehicle when loaded to capacity with brine. The portable brine generation system 210 can be transported between the first site 310 and the second site 320 by being towed by the vehicle 300. The vehicle 300 can be any suitable vehicle with sufficient towing capacity to transport the mobile brine generation system 210.

Referring to FIG. 10, the portable brine generation system 210 can be removably connected to the supply station 315 of the site 310 via the connection plate 219 (see FIG. 6) to various hookups, e.g., fresh water, electricity, and compressed air. The hookups can be located in a weather-proof supply cabinet 340. The supply cabinet 340 can house a freshwater outlet connection 345, an air supply line 291, and one or more electrical receptacles 347.

The freshwater outlet connection 345 is in fluid communication with a water source, such as a municipal water supply or a well system associated with the site 310, via suitable plumbing. In embodiments, the water source can be treated so that the freshwater has a reduced amount of contaminants or other unwanted materials therein. The freshwater outlet connection 345 can be substantially similar to the freshwater inlet connection 221 of the portable brine generation system 210. The freshwater outlet connection 345 is adapted to have one end of a freshwater supply conduit 350 movably connected thereto (see FIG. 11) for selectively supplying the water source 21A of the site 310 to the freshwater inlet connection 221 of the portable brine generation system 210.

The air supply line 291 is in pneumatic communication with a source of pressurized air, such as that provided by a suitable compressor. In embodiments, the air supply line 291 can be coiled around a reel disposed within the cabinet 340 such that the air supply line 291 can be retracted within the cabinet 340 and wound around the reel when it is not in use. In embodiments, the reel is spring-biased to wind the air supply line 291 automatically.

Each electrical receptacle 347 of the cabinet 340 can be in electrical communication with a power source, such as a municipal electrical supply or a generator associated with the site 310, via suitable wiring. The electrical receptacle 347 can be configured to provide electricity in a suitable form for use by the portable brine generation system 210, e.g., 120V AC and/or 240V AC. Each electrical receptacle 347 can be placed in electrical communication with one of the electrical receptacles 223, 225 of the portable brine generation system 210 via a suitable electrical cord or cable 355 (see FIG. 11). In embodiments, the supply cabinet 340 can include multiple electrical receptacles 347.

A supply of salt crystals 16A can be located near the supply cabinet 340. In this manner, salt crystals 16 can be more efficiently loaded into the portable brine generation system 210 when it is removably connected to the supply station 315 at the site 310.

Figure 11:
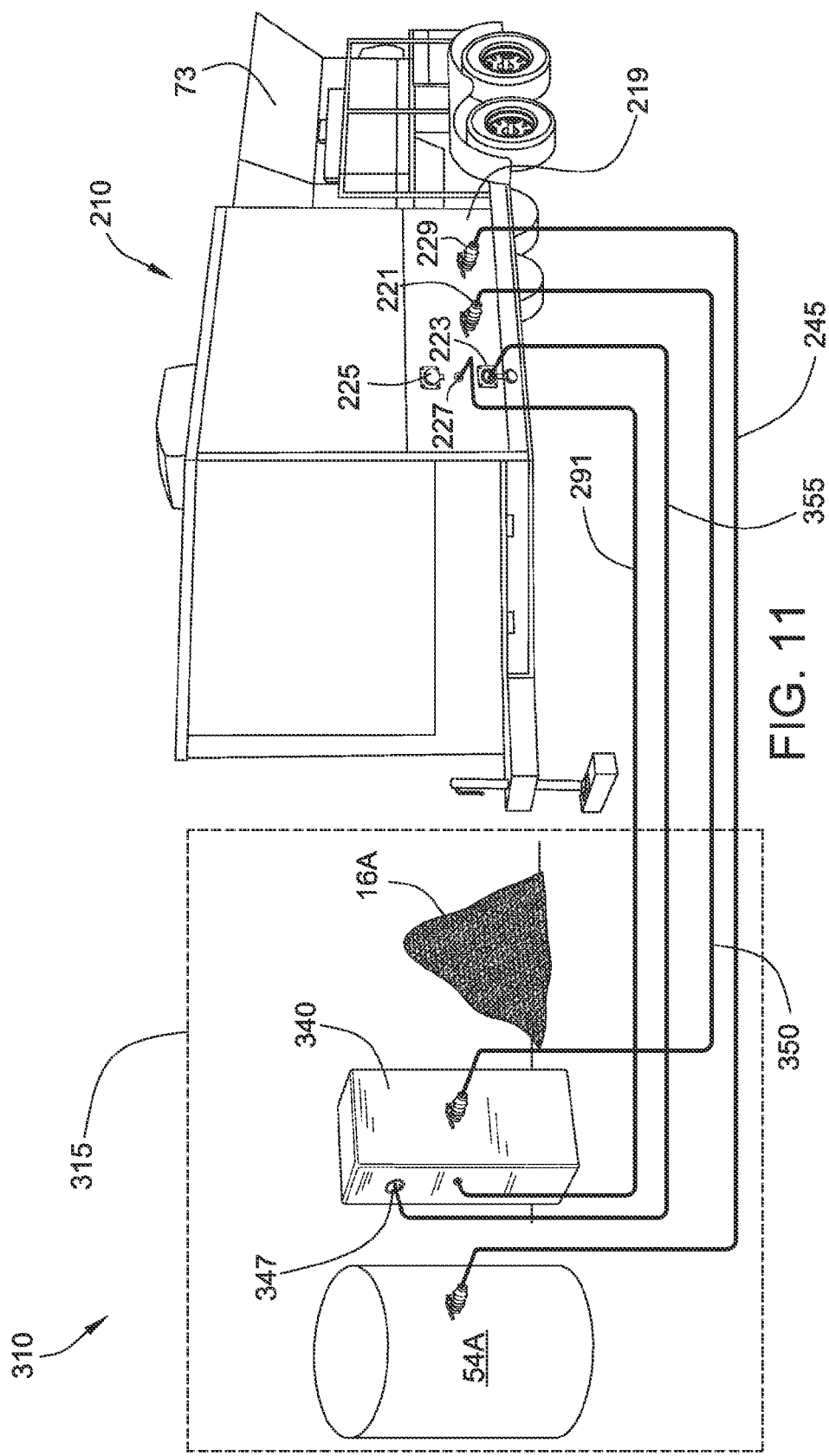
FIG. 11 is a simplified schematic view of the brine generation system of FIG. 5 removably connected to a connection tower as in FIG. 10 and a brine storage tank.

Referring to FIG. 11, the portable brine generation system 210 can be transported to the first site 310 using the vehicle 300. In the illustrated embodiment, the mobile brine generation system 210 can be unhitched from the vehicle 300 once it is placed in a desired location at the site 310. Once located at the first site 310, the portable brine generation system 210 can be removably connected to the first supply station 315.

The first water source 21A can be selectively provided to the portable brine generation system 210 via the freshwater supply conduit 350 which is removably connected to the freshwater inlet connection 221 of the connection plate 219. The portable brine generation system 210 can receive electrical power via the cable 355 extending between each associated electrical receptacle 223, 225 of the connection plate 219 and the supply cabinet 340 (one shown in FIG. 11). The brine discharge port connection 229 can be in fluid communication with the storage tank 54A via the discharge conduit 245, which is removably connected to the brine discharge port connection 229. In addition, the air supply line 291 can be removably connected to the air inlet 227 of the connection plate 219.

The hopper 73 of the portable brine generation system 210 can be loaded with salt crystals 16 from the first supply of salt crystals 16A located at the first site 310. The portable brine generation system 210 can generate brine 27 at the first site 310 in accordance with the description above. Brine can be discharged from the portable brine generation system 310 via the brine discharge port connection 229 into the first storage tank 54A, where it may be stored for future use. In embodiments, the first storage tank 54A can comprise a brine tank mounted on a service vehicle adapted to apply the brine on local roadways.

After generating brine at the first site 310, the portable brine generation system 210 can be disconnected from the hookups of the first supply station 315 and then be transported to the second site 320 using the vehicle 300. Once located at the second site 320, the portable brine generation system 210 can be removably connected to the second supply station 325, which can be substantially similar to the first supply station 315 in configuration and functionality. The portable brine generation system 210 can be used at the second site 320 to generate brine in a manner similar to that described with respect to the first site 310.

In embodiments, the portable brine generation system 210 can be used to generate brine at any number of sites. Furthermore, it is contemplated that the portable brine generation system 210 can be transported between numerous stations so that it may generate brine at a site which is located closer to the roadways on which the brine will be distributed than at least one other site which also contains a suitable supply station.

In embodiments of a method for generating a brine solution for treating roadways using a brine generation system, the brine generation system can include a tank unit having a tank body and a permeable divider. The tank body is segmented into the upper portion and a lower portion by the permeable divider. The divider is adapted to resist the movement of salt crystals greater than a predetermined size from the upper portion to the lower portion and is adapted to permit the brine solution to pass from the upper portion through the divider to the lower portion by the effect of gravity. The upper portion defines an upper volume and includes at least one water jet positioned within the lower two thirds of the upper portion of the tank body.

The brine generation system includes a mobile platform having a support surface and at least one ground engaging element rotatably mounted to the mobile platform. The tank unit is disposed on the support surface of the mobile platform.

Salt crystals are deposited in an upper portion of the tank body. A stream of water is injected through the at least one water jet within the upper portion of the tank body such that the water contacts salt crystals within the upper portion of the tank body to form the brine solution in the upper portion of the tank body. The brine solution is allowed to pass from the upper portion of the tank body through the permeable divider and flow into the lower portion of the tank body.

The brine generation system is transported to a first brine station using the mobile platform. The stream of water injected through the at least one water jet within the upper portion of the tank body is provided by connecting the at least one water jet to a first water source at the first brine station.

The at least one water jet within the upper portion of the tank body can be disconnected from the first water source. The brine generation system can be transported to a second brine station using the mobile platform. The second brine station is in spaced-apart relationship with the first brine station.

The at least one water jet can be connected to a second water source at the second brine station. The brine generation system can be used to produce the brine solution at the second brine station using water from the second water source. In embodiments, salt crystals are loaded into the hopper of the tank body at one or both of the first and second brine stations.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," and "side" describe the orientation of portions of the component within a consistent but arbitrary frame of reference which is made clear by reference to the text and the associated drawings describing the component under discussion. Such terminology can include the words specifically mentioned above, derivatives thereof, and words of similar import. Similarly, the terms "first," "second," and other such numerical terms referring to structures do not imply a sequence or order unless clearly indicated by the context.

When introducing elements or features of the present disclosure and the exemplary embodiments, the articles "a," "an," "the," and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller" and "a processor" can be understood to include one or more controllers or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A brine generation system comprising:
a tank unit including a tank body and a divider, the tank body defining a volume therein and having an upper opening in communication with the volume for receiving salt crystals therethrough, the tank body defining a brine outlet in communication with a lower portion of the tank body, the divider disposed in the tank body and separating the volume within the tank into an upper portion configured to hold salt crystals and the lower portion configured to hold a brine solution, the divider being adapted to resist the movement of salt crystals greater than a predetermined size from the upper portion to the lower portion and being adapted to permit the brine solution to pass from the upper portion through the divider to the lower portion by the effect of gravity;
a freshwater conduit disposed within the upper portion of the tank body, the freshwater conduit including at least one water jet adapted to discharge a stream of water from the freshwater conduit in a direction toward the divider and the lower portion of the tank body;
a salinity control system in fluid communication with the brine outlet of the tank body, the salinity control system adapted to determine a salinity of the brine solution received from the brine outlet and to return the brine solution to the upper portion of the tank body when the salinity is below a predetermined level;
wherein the divider includes a sump channel having an opening in communication with the upper portion of the tank unit, the sump channel being adapted to collect non-soluble particles greater than a predetermined size and being in communication with a sediment discharge port defined in the tank body, and the sump channel including at least a portion that is adapted to permit the brine solution in the sump channel to pass therethrough to the lower portion of the tank unit.

2. The brine generation system of claim 1, wherein the salinity control system includes a controller, a brine conduit connected to the brine outlet of the tank body and in fluid communication with the lower portion of the tank body, a sensor adapted to sense a salinity of the brine solution conveyed in the brine conduit and in communicative relationship with the controller to send a salinity signal to the controller indicative of the salinity measured, a pump in fluid communication with the brine conduit, a valve bank in fluid communication with the pump and in operative relationship with the controller, a return conduit connected to the valve bank and arranged with the upper portion of the tank unit, and a discharge port in fluid communication with the valve bank, the pump adapted to convey the brine solution from the brine conduit to the valve bank, the controller adapted to selectively operate the valve bank to direct the brine solution received from the pump to the return conduit for dispensing in the upper portion of the tank body when the salinity measured by the sensor is below the predetermined level and to the discharge port for discharging the brine solution received from the pump out of the salinity control system when the salinity measured by the sensor is at a predetermined level.

3. The brine generation system of claim 2, further comprising:
a mechanical sweeper disposed in the sump channel, the mechanical sweeper adapted to urge the non-soluble particles in the sump channel out of the tank unit through the sediment discharge port.

4. The brine generation system of claim 3, wherein the sump channel has an elongate shape extending along a major dimension of the tank and an ejection end adjacent the sediment discharge port, the mechanical sweeper comprises an auger extending along the sump channel and adapted to move the non-soluble particles toward the ejection end of the sump channel.

5. The brine generation system of claim 3, wherein the upper portion of the tank unit defines an erosion chamber disposed above the sump channel, and further comprising:
a valve plate disposed between the erosion chamber and the sump channel, the valve plate being moveable between positions adapted to variably occlude the opening of the sump channel to control passage of material from the erosion chamber to the sump channel, the material including non-soluble particles and salt crystals.

6. The brine generation system of claim 2, wherein the salinity control system includes a metering conduit extending between the freshwater conduit and the brine conduit and a metering valve adapted to selectively open and close the metering conduit, the metering valve in operative arrangement with the controller, and the controller is adapted to selectively open the metering valve to direct water from the freshwater conduit to the brine conduit when the salinity measured by the sensor is above the predetermined level and close the metering valve when the salinity measured by the sensor is at or below the predetermined level.

7. The brine generation system of claim 2, further comprising:
a mobile platform including a support surface and at least one ground engaging element rotatably mounted to the mobile platform, the tank unit and the salinity control system disposed on the support surface of the mobile platform.

8. The brine generation system of claim 7, wherein the brine conduit includes a first expansion coupling connecting the brine conduit to the pump, and the salinity control system includes a second expansion coupling in fluid communication with, and disposed between, the pump and the valve bank.

9. The brine generation system of claim 7, wherein the salinity control system includes a supporting structure having vibration isolating elements adapted to isolate the pump from the supporting surface of the mobile platform to dampen vibration transmission from the mobile platform to the pump.

10. The brine generation system of claim 7, further comprising:
an enclosure mounted to the mobile platform, the pump of the salinity control system disposed within the enclosure.

11. The brine generation system of claim 10, wherein the salinity control system includes an operator interface panel in electrical communication with the controller, the operator interface panel mounted to an exterior surface of the enclosure.

12. The brine generation system of claim 7, wherein at least a portion of the brine conduit is translucent.

13. The brine generation system of claim 7, wherein the salinity control system includes a drain port in fluid communication with the brine conduit, the drain port selectively openable to drain fluid in the salinity control system.

14. The brine generation system of claim 13, wherein the salinity control system includes a vent port disposed above the drain port, the vent port selectively openable to admit air into the salinity control system to facilitate the draining of the salinity control system, when the drain port is open.

15. The brine generation system of claim 7, wherein the freshwater conduit includes an inlet, and the brine generation system further comprising:
a first supply station located at a first site and adapted to be removably connected to the freshwater conduit and the salinity control system, the first supply station including a first water source, a first supply conduit in fluid communication with the first water source and adapted to selectively dispense water from the first supply conduit, a first storage tank configured to hold the brine solution, and a first discharge conduit in fluid communication with the first storage tank, the first supply conduit adapted to be removably coupled to the inlet of the freshwater conduit such that water from the first water source is selectively discharged from each water jet of the freshwater supply conduit, the first discharge conduit adapted to be removably coupled to the discharge port of the salinity control system such that the brine solution discharged out of the discharge port from the salinity control system is conveyed through the first discharge conduit to the first storage tank;
a second supply station located at a second site and adapted to be removably connected to the freshwater conduit and the salinity control system, the second supply station including a second water source, a second supply conduit in fluid communication with the second water source and adapted to selectively dispense water from the second supply conduit, a second storage tank configured to hold the brine solution, and a second discharge conduit in fluid communication with the second storage tank, the second supply conduit adapted to be removably coupled to the inlet of the freshwater conduit such that water from the second water source is selectively discharged from each water jet of the freshwater supply conduit, the second discharge conduit adapted to be removably coupled to the discharge port of the salinity control system such that the brine solution discharged out of the discharge port from the salinity control system is conveyed through the second discharge conduit to the second storage tank;
wherein the second site is in spaced relationship with the first site such that the second supply station is not able to be connected to the freshwater conduit and the salinity control system when the first supply station is removably connected thereto.

16. The brine generation system of claim 15, wherein the first brine station has a first supply of salt crystals, and the second brine station has a second supply of salt crystals.

17. The brine generation system of claim 15, wherein the first brine station has a first power source adapted to be removably coupled to the salinity control system to selectively operate the salinity control system, and the second brine station has a second power source adapted to be removably coupled to the salinity control system to selectively operate the salinity control system.

* * * * *